United States Patent [19]
Kobler

[11] 4,232,346
[45] Nov. 4, 1980

[54] APPARATUS FOR REPEATED REPRODUCTION OF INTELLIGENCE ON SELECTED PORTIONS OF MAGNETIC TAPE

[75] Inventor: Richard Kobler, Oberägeri, Switzerland

[73] Assignees: Edith Kobler, Oberägeri; Ernst Frey, Unterägeri, both of Switzerland

[21] Appl. No.: 937,211

[22] Filed: Aug. 28, 1978

[30] Foreign Application Priority Data

Aug. 31, 1977 [CH] Switzerland ............... 10634/77

[51] Int. Cl.³ .................. G11B 15/18; G11B 15/06; G11B 19/18
[52] U.S. Cl. ........................... 360/71; 360/72.1; 360/72.2; 360/72.3; 360/74.1
[58] Field of Search ................ 360/71, 72.1, 72.2, 360/72.3, 69, 74.1, 74.4; 353/25, 26 A

[56] References Cited
U.S. PATENT DOCUMENTS

| | | | |
|---|---|---|---|
| 3,541,271 | 11/1970 | Joslow et al. | 360/71 |
| 3,812,532 | 5/1974 | Crosser et al. | 360/72.3 |
| 3,822,372 | 7/1974 | Coenen et al. | 200/157 |
| 3,913,133 | 10/1975 | Aregger | 360/72.3 |
| 3,921,220 | 11/1975 | Primosch et al. | 360/72.3 |
| 4,066,872 | 1/1978 | Karp et al. | 360/72.1 |

Primary Examiner—Alfred H. Eddleman
Attorney, Agent, or Firm—Peter K. Kontler

[57] ABSTRACT

A tape recorder has a starter knob which is depressed during playback to cause a first memory to store information pertaining to the start of a sequence of sounds which are to be reproduced again. When the knob is released, a second memory stores information pertaining to the end of the selected sequence and the motor of the tape recorder is set to rewind the corresponding portion of the tape, either automatically or on depression of a repeater knob. The information which is stored in the first memory serves to start the motor for playback when the rewinding of that length of tape which bears the selected sequence of sounds is completed, and the information in the second memory serves to initiate rewinding of tape upon completion of renewed reproduction of the selected sequence. The starter knob can be depressed again to change the length of the selected sequence of sounds. An off knob is depressed when the operator wishes to erase the information which is stored in the memories or to transfer information from the second memory into the first memory so that the next repetition cycle involves repeated reproduction of a sequence of sounds which immediately follows the previously selected sequence.

42 Claims, 14 Drawing Figures

APPARATUS FOR REPEATED REPRODUCTION OF INTELLIGENCE ON SELECTED PORTIONS OF MAGNETIC TAPE

CROSS-REFERENCE TO RELATED CASES

The apparatus of the present invention constitutes an improvement over and a further development of apparatus which are disclosed in U.S. Pat. No. 3,913,133 granted Oct. 14, 1975 to Aregger and in copending patent application Ser. No. 780,071 filed Mar. 22, 1977 by Ernst Frey et al, now abandoned.

BACKGROUND OF THE INVENTION

The present invention relates to an apparatus for the control of a mobile carrier with intelligence stored on it for repetition of a carrier sequence between a pre-selectable start- and end-position in a machine for recording and reproducing said intelligence. Typical examples of such machines are magnetic tape recorders.

Combinations of such apparatus with the above outlined machines are often employed by students or teachers, e.g., in language or music schools. An important prerequisite for utility of such apparatus is that the operations involving memorizing selected portions of the carriers should be simple so that each such operation can be carried out with little loss in time and does not detract the user's attention from the knowledge to be gained by perceiving the intelligence (i.e., by listening to sound which is recorded on magnetic tape, on a wire, drum, disc or another carrier). In other words, the controls which be manipulated should be simple so that the user will not be fascinated by and adsorbed in the task of pulling, pushing, pivoting, touching or otherwise actuating various knobs, buttons, levers, heat-sensitive switches or orther types of actuating and control elements. Absorption into the task of operating the apparatus invariably affects the user's ability to concentrate upon the sound which is recorded on the carrier.

A further important requirement which must be met by apparatus of the above outlined character is that the user should be in a position to rely on the memory of the apparatus, i.e., that the user can relax and devote his or her attention to playback of the carrier as soon as the manipulations which are needed to store information denoting selected parts of the carrier (namely, that portion of the carrier which stores a selected amount of intelligence) are completed.

OBJECTS AND SUMMARY OF THE INVENTION

An object of the invention is to provide a simple but reliable apparatus for the control of a mobile carrier with intelligence stored on it for repetition of a carrier sequence between a pre-selectable start- and end-position in a machine for recording and reproducing said intelligence.

Another object of the invention is to provide an apparatus whose manipulation is so simple, that it can be completed with little loss in time and without detracting the user's attention from the contents of recorded intelligence.

A further object of the invention is to provide novel and improved means for selecting selected portions of a carrier of intelligence for renewed reproduction of the sound or other information which is stored thereon.

An additional object of the invention is to provide the apparatus with means which enables the user to repeat the reproduction of selected amounts of intelligence once or more than once.

Another object of the invention is to provide an apparatus which enables the user to repeatedly reproduce selected amounts of intelligence in a given sequence, for example, intelligence which is stored on successive lengths of a magnetic tape.

A further object of the invention is to provide an automatic or semiautomatic apparatus of the above outlined character which is especially suited for use by students for memorizing selected passages of recorded sound or other intelligence.

An additional object of the invention is to provide an apparatus of the above outlined character which can be embodied in or combined with existing types of recording and reproducing machines.

A further object of the invention is to provide an apparatus which does not interfere with normal operation of the recording and reproducing machine when the user does not wish to repeatedly reproduce selected amounts of recorded intelligence.

Another object of the invention is to provide an apparatus which can be used with advantage by adolescents or adults and which can be rapidly reset to memorize different portions of the carrier of recorded intelligence for repeated playback.

An ancillary object of the invention is to provide rudimentary controls for an apparatus of the above outlined character.

Another object of the invention is to provide an apparatus which can be reset in the course of repeated reproduction of selected amounts of recorded intelligence.

An additional object of the invention is to provide an apparatus whose operation is so simple that it can be readily manipulated by temporarily or permanently handicapped persons.

A further object of the invention is to provide an apparatus which can be operated by remote control, e.g., by resorting to one or more foot pedals.

Another object of the invention is to provide an apparatus which can be manipulated by the upper or lower extremities of the users, e.g., in educational institutions for handicapped persons, in hospitals, sanatoria and convalescent homes.

A feature of the invention resides in the provision of an apparatus for the control of a mobile carrier with intelligence stored on it for repetition of a carrier sequence between a preselectable start- and end-positions in a machine for recording and reproducing said intelligence. The machine may be a tape recorder, the mobile carrier a magnetic tape in a cassette. The apparatus comprises a single switch means for selection of the mentioned position. The switch means are e.g. a knob which is depressible against the opposition of one or more springs. It is further actuatable either by hand, by a pivotable lever or the like, or by remote control e.g. on actuation of a foot pedal.

In a specific embodiment, wherein the machine comprises control means for its operation (e.g. operator actuatable keys for playback, stop-, and rewind-operations) as well as driving means for said carrier for forwards and backwards movement, (e.g. a reversible electric motor coupled to appropriate axes to drive tape reels paying out or collecting the tape) the apparatus comprises detector means for the carrier position (e.g. a gear train in mechanical realization or an optical coded disc with a subsequent light emittor/receiver with optoelectronic converters as photo-transistors and an electronic counter), storing means coupled to said detector means for the storage of values according to said start- and end-positions (e.g. at least partly settable mechanical parts being positionable within the moving path of parts of the above mentioned gear train or electronic storage registers) and further comprises comparator means which are connected on one hand to the storage means, on the other hand with said detector means and which are operatively coupled to the control means for said machine (e.g. the comparator means being contact pairs mounted to parts of the gear train and to parts positionable along the above mentioned movement path or being formed by electronic e.g. logic circuities, both the contact pairs or the electronic circuitry acting e.g. via electro-mechanical converters as cam shafts or solenoids on the operator keys of the machine), the switching means providing two different signal states in response to its actuation (e.g. a rising and a falling signal edge or a low/high signal state) connecting said storing means with said detector means for storing said values (e.g. by a mechanical connection of the above mentioned gear train and the mechanical parts positionable within the movement path or by electrically connecting electronic registers with an output of an electronic detector e.g. the above mentioned opto-electric converter with a subsequent pulse counter).

The values stored in the storing means are values according to the output of the detector means and represent start- and end-positions for the carrier-sequence to be repeated. The comparator means may be operatively coupled to the control means (the control means being as mentioned above e.g. operator keys of a tape recorder) by means of a further switch means enabling the operator to decide how often the sequence selected is to be repeated by accordingly operating that interconnected switch. In other words, if the carrier is a magnetic tape, rewinding of the selected portion of tape need not to begin automatically upon completion of first playback of this portion; however the second playback begins in automatic response to completion of rewinding. The storing means are first coupled to the detector means upon a first actuation of the switching means. The storing means then are loaded with the momentary output value of the detector means which is either a mechanical position or an electric signal representing the momentary carrier position. As the playback of the carrier continues, the loaded storing means, loaded with the value representing the start position, do not effect the first play-back operation of the machine and the operator again actuates the switching means. By this second action and the according second signal state provided by the switching means the detector means are again connected with the storing means so that a second value representing the end position of the sequence to be repeated is loaded into the storing means.

The comparator means detect at this very moment that the output signal (either mechanical position or an electronic signal) of the detector means matches the second value now stored in the storing means and produce a mechanical or electronic control signal for the control means (the operator keys of the tape recorder) so that if a further switch is inter-connected between the comparator means and the control means, actuation of said switch causes the control means, i.e. at this moment especially the rewind-key of the tape recorder, to be depressed or, if no inter-connected switch is provided the produced control signal directly causes depression of especially the mentioned key. Thus, the machine is controlled into rewind-mode and the carrier is rewound until the comparator means detect that the detector means' output signal matches the first value stored in the storing means which represents the start position of the sequence to be repeated. Then the comparator means provide again a control signal which causes the control means (the operator keys of the machine) again to be depressed, at this moment especially the play-back key. Thus, when a start position of the sequence to be repeated is reached the machine is switched into play-back mode.

The novel features which are considered as characteristic of the invention are set forth in particular in the appended claims. The improved apparatus itself, however, both as to its construction and its mode of operation, together with additional features and advantages thereof, will be best understood upon persual of the following detailed description of certain specific embodiments with reference to the accompanying drawing.

DESCRIPTION OF THE PREFERRED EMBODIMENTS

The apparatus of the present invention is associated with or incorporated into a commercially available tape recorder, (the machine), e.g., a recorder which utilizes cassettes containing a carrier of intelligence, preferably in the form of magnetic tape. The details of the tape recorder are shown and described only to the extent which is necessary for full understanding of the invention. The improved apparatus (hereinafter called attachment) serves for controlling for repeated reproduction of intelligence (sound) which is stored on selected portions or segments of the tape. It is immaterial whether the tape is stored in a cassette or on rotary supply and takeup reels which are not confined in a cassette.

Figure 1:
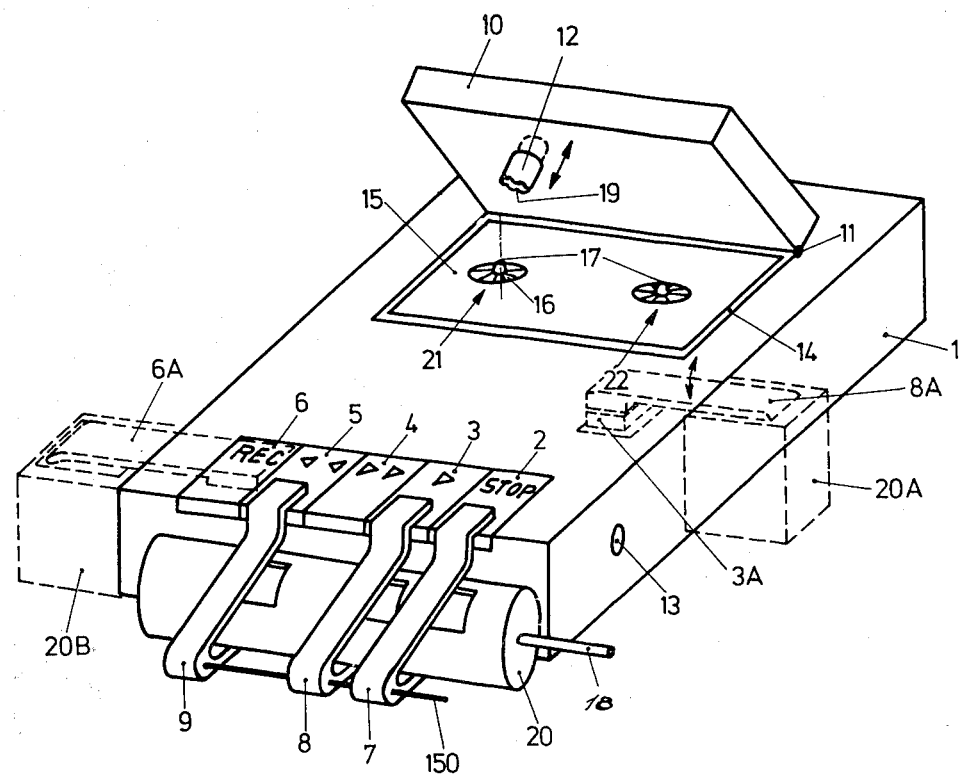
FIG. 1 is a perspective view of a tape recorder which is combined with an apparatus embodying one form of the invention.

The tape recorder 1 of FIG. 1 comprises a housing which supports control means as a stop button 2, a playback button 3, a forward transport button 4, a rapid rewind button 5, and a recording button 6. The housing of the tape recorder 1 is further formed with a socket 13 for a plug, not shown. The plug is connected with an external switch which can be actuated to start or arrest the prime mover 99 (see FIG. 5) of the tape recorder, i.e., the motor which drives the tape lengthwise, either forwardly or in reverse.

The top wall of the housing of the tape recorder 1 has a rectangular recess or chamber 14 for a cassette 15. The means for transporting the tape comprises a supply unit 21 and a takeup unit 22. Each of these units has a fluted spindle 17 extending into the complementary hub 16 of the corresponding reel in the cassette 15.

In the embodiment of FIG. 1, an attachment 10 constitutes a cover for the chamber 14 and is pivotably secured to the top wall of the housing of the tape recorder 1 by a hinge 11. An axially movable coupling crown 12 is located at the underside of the attachment 10 in such position that it may register with the supply unit 21 when the attachment 10 is moved to the operative position in which it overlies the chamber 14 and the cassette 15. The end face of the coupling crown 12 has recesses 19 which receive complementary male portions of the corresponding spindle 17 when the attachment 10 overlies the cassette or magazine 15 in the chamber 14.

The buttons 2, 3 and 5 can be depressed by V-shaped actuating elements 7, 8 and 9 which constitute two-armed levers and are pivotable on a horizontal supporting shaft 150. The actuating levers 7, 8 and 9 can be pivoted by an electro/mechanical driver means, e.g., by corresponding motor driven cams on a roller 20 which is mounted on a shaft 18 extending in parallelism with the shaft 150.

Figure 2:
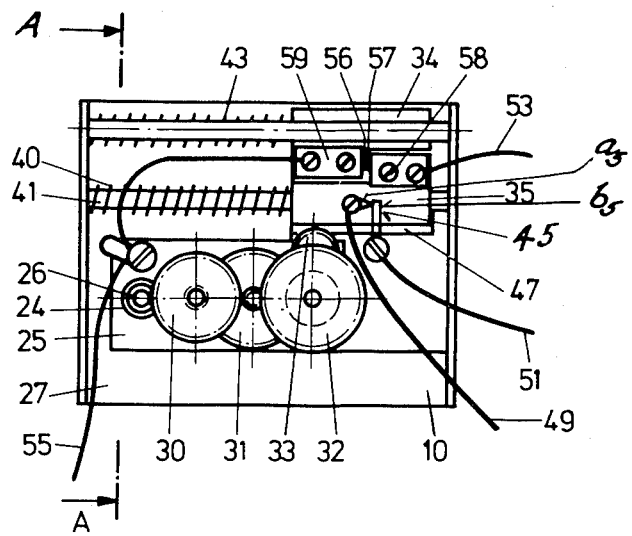
FIG. 2 is a plan view of certain parts of the apparatus which is shown in FIG. 1 and which comprises mechanical memories for selected parts of the carrier.
Figure 3:
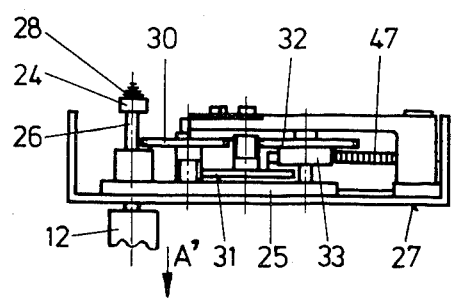
FIG. 3 is an elevational view of the structure which is shown in FIG. 2.

FIG. 2 is a plan view of the attachment 10 with the top wall or cover of its casing removed. Certain parts of the attachment 10, including a reciprocable slide or rail 46 (see FIG. 4) and several knobs have been omitted in FIG. 2 for the sake of clarity. Such parts are assumed to be located in front of the structure shown in FIG. 2 (see the line A-A which denotes the plane of FIG. 4). Those parts of the attachment 10 which are shown in FIG. 2 include two mechanical memories and are assumed to be held in inoperative or starting positions. The attachment 10 comprises a base plate 25 which is rigid with a chassis or frame 27. A shaft 26 is rotatably and axially movably journalled in the base plate 25 and chassis 27 in such a way (see FIG. 3) that one of its end portions extends outwardly beyond the chassis 27. This end portion of the shaft 26 carries the coupling crown 12. The other end portion of the shaft 26 carries a gear 24 and is biased downwardly, as viewed in FIG. 3, by a spring 28 (see the arrow A'). A gear 30 is rotatably mounted on the base plate 25 and meshes with the gear 24 when the shaft 26 is moved downwardly, as viewed in FIG. 3, so that the coupling crown 12 enters the adjacent hole of the cassette 15 in the chamber 14 and can receive torque frm the corresponding spindle 17.

The gear 30 can transmit torque to a gear train including gears 31, 32 and 33 mounted in the base plate 25. The gear train 31-33 is preferably a step-down transmission and its gear 33 meshes with a straight-toothed rack 47 on a mobile component here shown as an L-shaped detector carrier 35 in the frame 27. The detector carriage 35 is reciprocably mounted on an elongated tie rod or guide 41 whose ends are secured to the frame 27 and which is surrounded by a helical spring 40 tending to yieldably bias the detector carriage 35 in a direction to the right, as viewed in FIG. 2, to a predetermined end position.

The frame 27 further supports a second tie rod or guide 39 (see also FIG. 4) which is parallel to the tie rod 41 and supports a second mobile component in the form of a reciprocable L-shaped storage carriage 34. A helical spring 43 surrounds the tie rod 39 and urges the storage carriage 34 in a direction to the right, i.e., in the direction in which the detector carriage 35 is moved when the spring 40 is free to dissipate energy. The carriages 34 and 35 preferably consist of insulating (non-conducting) material. When the carriages 34, 35 assume the starting positions which are shown in FIG. 2, their shorter legs are adjacent to each other (between the tie rods 39 and 41) and those surfaces of the shorter legs which face each other are respectively provided with elastic contact springs 56, 57 which are secured to cable clamps 58, 59. The clamps 58, 59 are respectively mounted on the shorter legs of the carriages 34, 35. The contact springs 56, 57 constitute a switch as comparator unit, and are in engagement with each other when the carriages 34, 35 assume the right-hand end positions of FIG. 2 too, i.e., when the attachment 10 is not in use. A flexible electric conductor 55 is connected to the clamp 58 and extends from the attachment 10. The clamp 59 is connected with a conductor 53.

A blocking bar 42 has a rectangular cross-sectional outline (see FIG. 4) and is parallel with and adjacent to the tie rod 39. One side of the bar 42 is normally parallel to the adjacent surface of the storage carriage 34. This bar is rotatably mounted in the chassis 27 and constitutes a holding or arresting means for the storage carriage 34. The bar 42 is biased by a spiral spring 44 so that one of its edges bears against the storage carriage 34 (see FIG. 4) when the spring 44 is free to dissipate energy.

When the detector carriage 35 assumes the starting position of FIG. 2, it closes a switch 45 as comparator unit whose contacts are connected with conductors 49, 51 extending from the attachment 10.

Figure 4:
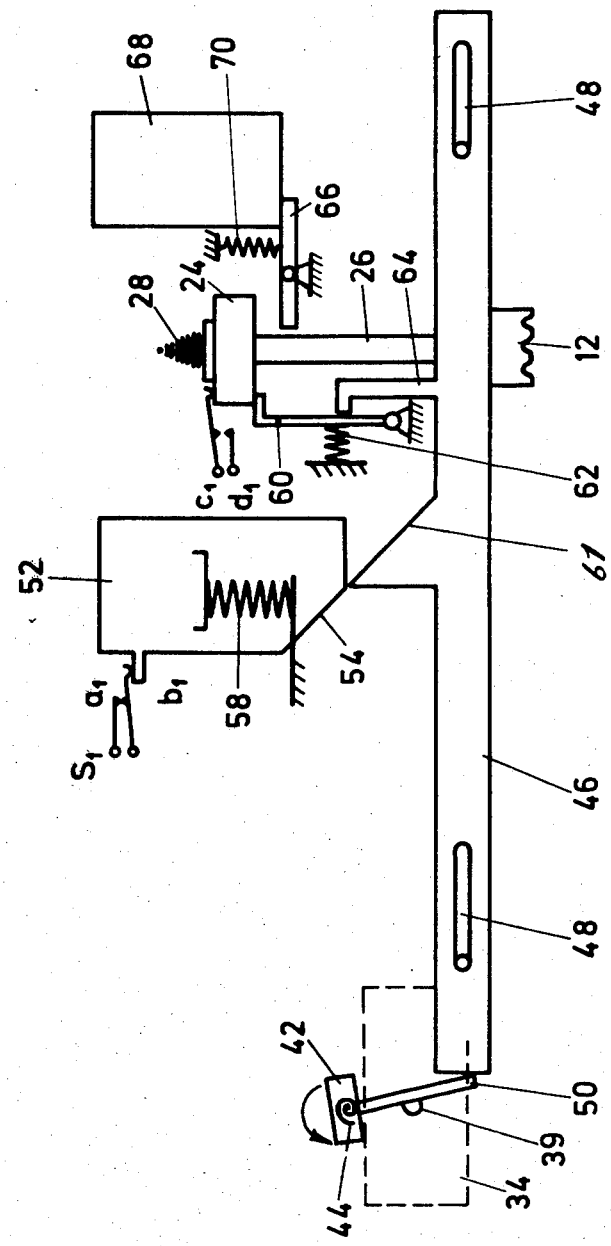
FIG. 4 is an enlarged view of certain other details of the apparatus of FIGS. 1 to 3.

FIG. 4 shows the aforediscussed parts 12, 24, 26, 28, 34, 42, 44 and the reciprocable slide or rail 46 which has elongated slots 48 for guide pins secured to the casing of the attachment 10. The structure of FIG. 4 can activate or deactivate the attachment 10 at the will of the operator. The slide 46 extends at right angles to the bar 42 and is located in the plane A—A of FIG. 2. A lever 50 on the bar 42 urges the slide 46 in a direction to the right, as viewed in FIG. 4, under the bias of the spring 44 so that the slide 46 assumes the illustrated end position.

A starter knob 52 which is movable at right angles to the longitudinal direction of the slide 46 has a suitably inclined cam face 54 which can slide along a complementary cam face 61 on a triangular protuberance of the slide to move the latter in a direction to the left, as viewed in FIG. 4, when the knob 52 is depressed to stress the spring 44. The lever or leaf spring 50 (which is rigid with the blocking bar 42) then pivots the bar 42 clockwise, as viewed in FIG. 4, and disengages the lower left-hand edge of the bar 42 from the storage carriage 34. This releases the storage carriage 34 for movement with the detector carriage 35 in a direction to the left, as viewed in FIG. 2. Depression of the starter knob 52 further results in disengagement of a movable contact b1 of a switch S1 from a second contact a1. When the pressure upon the starter knob 52 is relaxed, the spring 44 is free to dissipate energy and to propel the slide 46 toward the end position of FIG. 4 whereby the cam face 61 returns the knob 52 to the inoperative position of FIG. 4. The bias of the spring 44 can be assisted by a helical spring 58 which reacts against a stationary part of the attachment 10 and biases the knob 52 upwardly, as viewed in FIG. 4.

An L-shaped arresting lever 60 is pivotable in the plane of FIG. 4 and is biased by a helical spring 62 so that it tends to pivot clockwise, as viewed in FIG. 4, and to thereby move its bent-over free end portion into the path of movement of the gear 24 under the action of the spring 28. An L-shaped stop 64 of the slide 46 holds the lever 60 in the illustrated position when the slide assumes the end position of FIG. 4. Thus, when the slide 46 dwells in the position of FIG. 4, the spring 62 insures that the lever 60 holds the shaft 26, gear 24 and coupling crown 12 against movement toward the supply unit 21 of the cassette 15 in the chamber 14. When the starter knob 52 is depressed to move the slide 46 in a direction to the left, as viewed in FIG. 4, the stop 64 pivots the lever 60 counterclockwise to stress the spring 62 and to move the end portion of the lever 60 away from the path of movement of the parts 12, 24, 26 under the action of the spring 28. The spring 28 is then free to dissipate energy and to move the crown 12 into engagement with the corresponding spindle 17 in the cassette 15. The switch S1 comprises two additional contacts c1, d1 the former of which engages the latter when the gear 24 is free to move toward the position of mesh with the gear 30. The contact c1 is held away from the contact d1 by the gear 24 when the arresting lever 60 is free to assume the position of FIG. 4.

When the crown 12 is free to engage the corresponding spindle 17, it couples the reversible motor 99 (FIG. 5) of the tape recorder 1 with the detector carriage 35. The gear 24 then meshes with the gear 30 and is located immediately above (as viewed in FIG. 4) the left-hand arm of a two-armed lever 66 which can be pivoted by a resetting means 68 (hereinafter called off knob). The lever 66 is biased against the off knob 68 by a helical spring 70. When the starter knob 52 is depressed to enable the stop 64 to disengage the lever 60 from the gear 24 and the gear 24 moves axially under the bias of the spring 28, the lever 60 cannot return to the position of FIG. 4 even after the knob 52 is released to reassume the inoperative position of FIG. 4 because the gear 24 is then located in its lower end position (as viewed in FIG. 2 or 4) and the tip of the bent-over end portion of the lever 60 bears against the periphery of the gear 24. The lever 60 can reassume the position of FIG. 4 in response to depression of the off knob 68 which pivots the lever 66 clockwise so that the left-hand arm of the lever 66 lifts the gear 24 back to the position shown in FIGS. 3 and 4. The spring 62 is then free to expand and pivots the lever 60 clockwise to return the bent-over free end portion of the lever 60 into the path of downward movement of the gear 24. The spring 70 is free to contract when the pressure upon the knob 68 is relaxed so that the knob 68 automatically returns to its inoperative position and the lever 66 reassumes the neutral position of FIG. 4.

Figure 5:
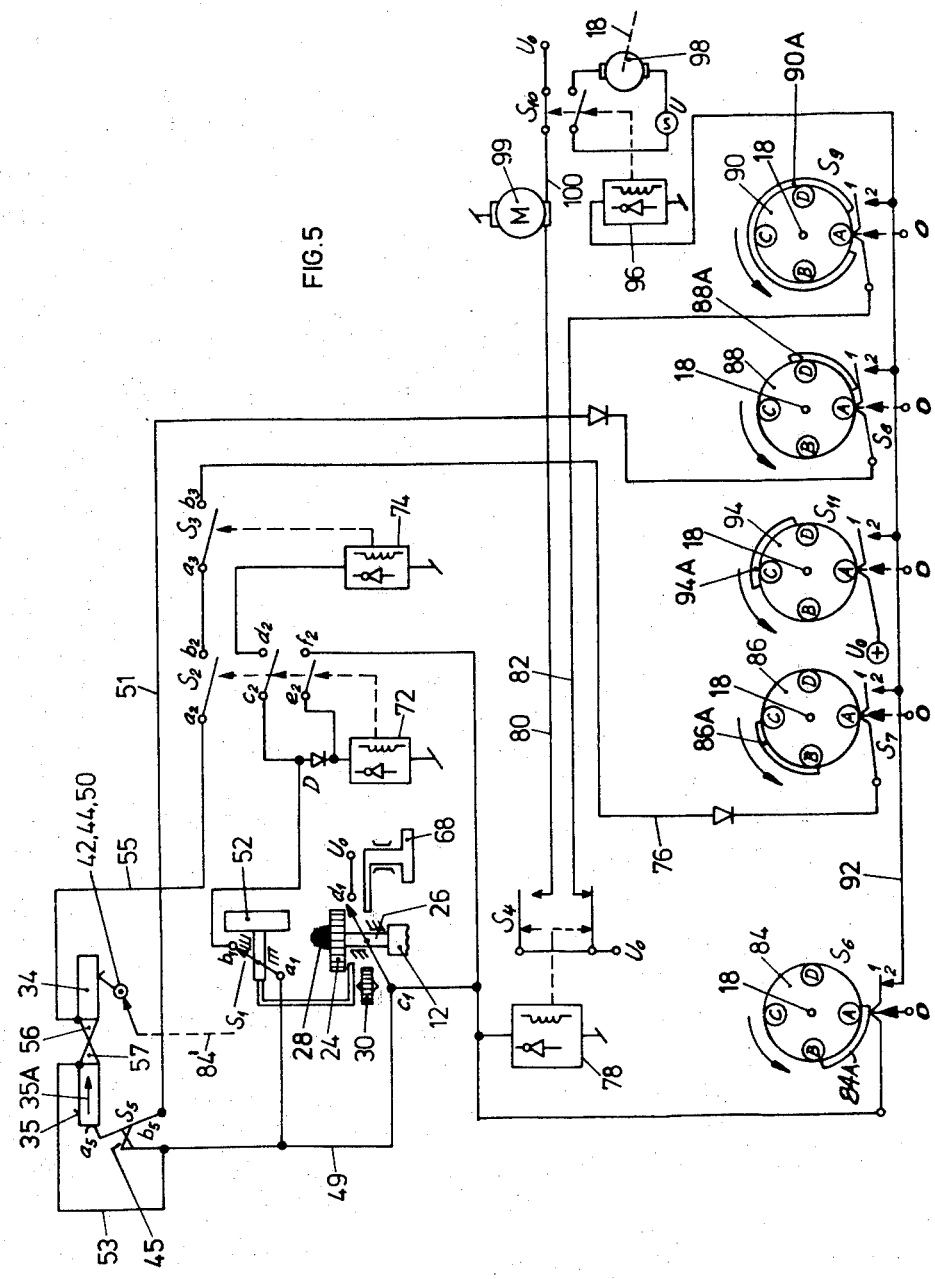
FIG. 5 is a diagrammatic view of the entire apparatus which embodies the structure of FIGS. 2 to 4.

FIG. 5 shows schematically the carriages 34, 35 and their contact springs 56, 57. As mentioned above, the carriages 34, 35 and their springs 56, 57 can be said to constitute a comparator unit-switch which is closed when the shorter arm of the detector carriage 35 is sufficiently close to the shorter arm of the storage carriage 34. The arrow 35A denotes the direction in which the storage carriage 34 is moved by detector carriage 35 against the opposition of the spring 40, namely, in response to counterclockwise rotation of the gear 33, as viewed in FIG. 2. The gear 33 rotates in such direction when the tape in the cassette 15 is transported forwardly. In FIG. 5, the carriages 34, 35 are shown in the starting positions corresponding to those of FIG. 2; therefore, the switch 45 is closed. The conductor 49 is connected with the contact a1 of the switch S1, and the contact b1 of the switch S1 engages the contact a1 when the starter knob 52 is held in the inoperative position. The contact b1 of the switch S1 is connected with the control input of actuating means 72 for a further switch S2. If the actuating means 72 is idle, the contacts a2, c2, e2 of the switch S2 are respectively disengaged from the contacts b2, d2, f2. The contact b1 of the switch S1 is connected with the contacts c2, e2 of the switch S2. When the switch S2 is closed by the actuating means 72, the conductor 49 forms a closed loop including the contacts a1, b1, e2 and f2. The contacts c2, d2 of the switch S2 then connect the conductor 49 with the control input of actuating means 74 for a switch S3 including the contacts a3 and b3. The contact a2 of the switch S2 is connected with the conductor 55, i.e., with the cable clamp 58 on the storage carriage 34. When the switches S2 and S3 are closed, the conductor 55 is connected with a conductor 76 via contacts a2, b2 and a3, b3.

The conductor 49 is further connected with the contact c1 of the switch S1, and the contact d1 of the switch S1 is connected with an energy source Uo. The contacts c1, d1 connect the source Uo with the conductor 49 when the gear 24 meshes with the gear 30 under the action of the spring 28, i.e., when the coupling crown 12 engages the corresponding spindle 17. The conductor 49 is also connected with the control input of actuating means 78 for an additional switch S4. When the actuating means 78 is operative, the switch S4 connects the energy source Uo with a conductor 80; when the actuating means 78 is idle, the switch S4 connects the energy source Uo with a further conductor 82 (this is shown in FIG. 5).

FIG. 5 further shows that the conductor 49 is connected with the aforementioned conductor 53 which is connected with the cable clamp 59 on the detector carriage 35. The movable contact a5 of the switch 45 (denoted as switch S5 in FIG. 5) is connected with the conductor 51. The reference character 84' denotes in FIG. 5 the mechanical connection between the starter knob 52 and the assembly including the blocking bar 42 for the reference carriage 34, the spring 44 and the lever 50.

The conductor 49 is further connected with the movable contact "1" of a switch S6 which is actuatable by the arcuate lobe 84A of a rotary cam 84. The conductor 76 is connected with the movable contact "1" of a switch S7 which can be actuated by the arcuate lobe 86A of a second rotary cam 86. The conductor 51 is connected with the movable contact "1" of a switch S8 which can be actuated by the arcuate lobe 88A of a third rotary cam 88, and the conductor 82 is connected with the movable contact "1" of a switch S9 which can be actuated by the arcuate lobe 90A of a fourth rotary cam 90. When the contact "1" of the switch S6, S7, S8 or S9 engages the second contact "2" of the respective switch S6, S7, S8 or S9, the conductor 49 is connected with a conductor 92. The rotary cams 84, 86, 88, 90 are connected to the output shaft 8 of a servomotor 98. This output shaft is further connected to a fifth rotary cam 94 whose arcuate lobe 94a can move the contact "1" of a switch S11 into engagement with the contact "2" of the switch S11. The contact "1" is connected with the energy source Uo, and the contact "2" is connected with the conductor 92.

The arcuate lobe 84A of the cam 84 extends along an arc of 90 degrees between the encircled indices A and B. The arcuate lobe 86A of the cam 86 extends along an arc of 90 degrees between the encircled indices B and C. The arcuate lobe 94A of the cam 94 also extends along an arc of 90 degrees substantially between the encircled indices C and D. The arcuate lobe 88A of the cam 88 extends along an arc of 90 degrees substantially between the encircled indices D and A, and the arcuate lobe 90A of the cam 90 extends along an arc of slightly less than 360 degrees; it is interrupted in the region of the encircled index A. It will be noted that the lobes 84A, 86A, 94A and 88A are angularly offset with respect to each other, as considered in the circumferential direction of the output shaft or element 18 of the servomotor 98, always by approximately 90 degrees. Thus, three of the switches S6, S7, S8, S11 are open when the fourth of these switches is closed. The reference character "O" denotes the starting or normal angular position of the output shaft 18 of the servomotor 98.

The conductor 92 is connected to the control input of actuating means 96 for a switch S10 which, when closed, connects the servomotor 98 with a source U of alternating current. At the same time, the switch S10 interrupts a connection (via conductor 100) between the aforementioned energy source Uo and the motor 99 which serves as a means for moving the tape 199 (FIG. 6) in the cassette 15 forwardly and in reverse. As shown in FIG. 5, the conductor 80 is connected to the same terminal of the motor 99 as the conductor 100. Thus, the motor 99 can be operated when the switch S10 is open because the lower terminal of this motor is then connected (or can be connected) with the energy source Uo via switch S4.

The shaft 18 for the roller 20 is connected with the output shaft of the servomotor 98. The following table represents the sequence in which the levers 7, 8 and 9 depress or release the corresponding buttons 2, 3 and 5 in different angular positions of the shaft 18. Such angular positions (denoted as "P") will be identified with reference to the aforementioned encircled indices A, B, C and D on the cams 84, 86, 88, 90 and 94 of FIG. 5.

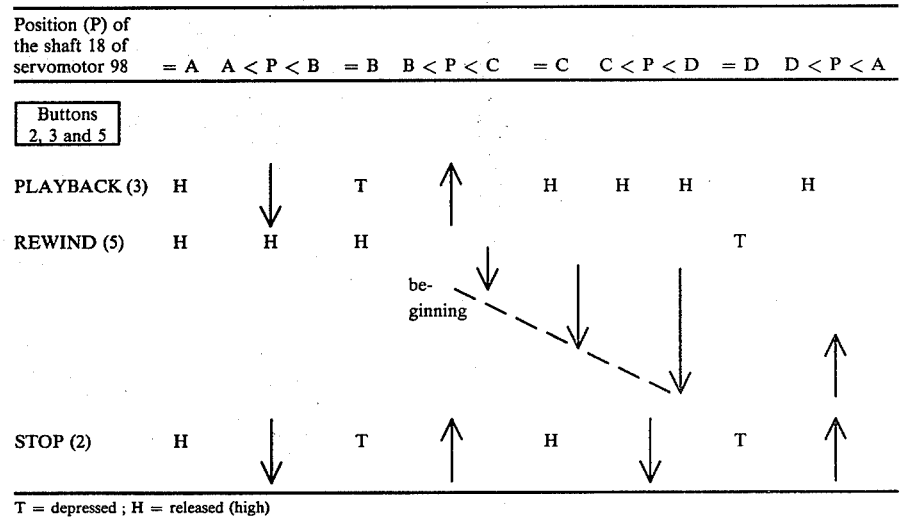

T = depressed ; H = released (high)

The operation of the attachment 10 will be described below with reference to FIGS. 1 to 5 (especially FIG. 5) and to the preceding table wherein "H" denotes "held in undepressed position" and "T" denotes "held in depressed position".

The user inserts a cassette 15 into the chamber 14 and depresses the playback button 3 so as to listen to the reproduction of recorded intelligence. When the playback reaches that stage where the part of recorded intelligence which is to be played back begins, the user depresses the stop button 2. From there on, the user can disregard the buttons 2 to 6 of the tape recorder and can devote his or her attention solely to the recorded intelligence as well as to the knobs 52 and 68 of FIG. 4.

As a first step, the user depresses the starter knob 52 to thereby start the playback of that part of recorded intelligence which is to be reproduced as often as desired or necessary. By depressing the knob 52, the user allows the contact b1 of the switch S1 to move away from the contact a1. Therefore, and since the contact c1 of the switch S1 is still disengaged from the contact d1, the switches S2 and S3 are open. As the user continues to depress the starter knob 52, the slide 46 continues to move in a direction to the left, as viewed in FIG. 4, and the stop 64 disengages the arresting lever 60 from the gear 24 so that the spring 28 expands and moves the coupling crown 12 into engagement with the corresponding spindle 17. At the same time, the gear 24 moves into mesh with the gear 30. Therefore, the contact c1 of the switch S1 is free to engage the contact d1 whereby the contacts c1 and d1 connect the conductor 49 with the energy source Uo. As described above, depression of the starter knob 52 further results in disengagement of the blocking bar 42 from the storage carriage 34 because the left-hand end face of the slide 46 (as viewed in FIG. 4) pivots the lever 50 clockwise and causes the underside of the bar 42 to move into a position of parallelism with the upper side of the carriage 34 whereby the spring 44 stores energy. The conductor 49 connects the control input of actuating means 78 with the energy source Uo whereby the actuating means 78 causes the switch S4 to connect the energy source Uo with the motor 99 via conductor 80, i.e., the playback is resumed. At the same time, the switch S4 disconnects the energy source Uo from the conductor 82. The lobe 84A of the cam 84 maintains the switch S6 in closed position, i.e., the conductor 49 connects the energy source Uo with the conductor 92. This causes the actuating means 96 (whose control input is connected with the conductor means 92 and hence with the energy source Uo) to actuate the switch S10 which connects the servomotor 98 with the energy source U and interrupts the connection between the energy source Uo and the motor 99. The servomotor 98 causes its shaft 18 to rotate the cams 84, 86, 88, 90 and 94 whereby the lobe 90A of the cam 90 closes the switch S9 with a minimum of delay (note that the lobe 90A extends along an arc of nearly 360 degrees). Furthermore, and since the shaft 18 of the servomotor 98 rotates the shaft 18 for the roller 20 of FIG. 1, the corresponding cam on the roller 20 causes the lever 8 to depress the playback button 3 practically immediately after the shaft 18 of the servomotor 98 leaves the zero position. This is shown in the preceding table by a downwardly directed arrow below $A<P<B$. At the same time, the roller 20 causes the lever 7 to depress ($\downarrow$) the stop button 2 (this is also shown in the table). The servomotor 98 continues to rotate its shaft 18 through approximately 90 degrees because the cam 84 (which also rotates in a counterclockwise direction, as viewed in FIG. 5) causes its lobe 84A to maintain the switch S6 in closed position until the cams have nearly reached "B"-position. The switch S6 opens immediately before the index B of the cam 84 moves in register with the reference index "O". The button 3 is depressed (T) as soon as the shaft 18 of the servomotor 98 and thus the cams leave "A"-position. It remains depressed because servomotor 98 stops as the switch S6 disconnects the conductor 49 from the conductor 92 and thereby causes the actuating means 96 to return the switch to the position shown in FIG. 5, i.e., the circuit of the servomotor 98 is open. The circuit of the motor 99 is still completed because the energized actuating means 78 causes the switch S4 to connect the energy source Uo with the motor 99 via conductor 80. The motor 99 continues to drive the tape 199 forwardly as long as the knob 52 remains in depressed or operative position. The gear 24 drives the gear 30 which, in turn moves the detector carriage 35 via gear train 31-33 and toothed rack 47 against the opposition of the spring 40. The detector carriage 35 pushes the storage carriage 34, i.e., the latter shares the movement of the carriage 35 and causes the spring 43 to store energy. The storage carriage 34 is free to leave its starting position because the blocking bar 42 is inactive as long as the starter knob 52 remains in the operative position. The switch including the contact springs 56, 57 remains closed; however, the switch S5 opens because its movable contact a5 is free to move away from the contact b5.

When the servomotor 98 is arrested while the index B of the cam 84 registers with the index "O", the lobe 86A of the cam 86 closes the switch S7. However, this does not entail any changes because the conductor 76 is not connected with the energy source Uo. The lobe 90A of the cam 90 continues to maintain the switch S9 in closed position but with no immediate effect because the switch S4 connects the conductor 80 with the energy source Uo, i.e., the conductor 82 is disconnected from the source Uo.

If the user thereupon relaxes or terminates the pressure upon the starter knob 52, the shaft 26 remains in the depressed position, i.e., the gear 24 continues to mesh with the gear 30 and the coupling crown 12 remains in engagement with the corresponding spindle 17. The contact b1 of the switch S1 returns into engagement with the contact a1 and the contact c1 of the switch S1 continues to engage the contact d1. As a result of engagement of the contact b1 with the contact a1, the conductor 49 connects the energy source Uo with the control input of the actuating means 72 and the switch S2 closes. The engagement of contacts e2 and f2 completes a holding circuit of the switch S2, i.e., this switch remains closed irrespective of whether or not the contact a1 engages the contact b1. Engagement of contacts c2, d2 results in closing of the switch S3, i.e., the contact a3 engages the contact b3.

As a further result of release of the knob 52, the blocking bar 42 engages the storage carriage 34 under the action of spring 44. The switch including the contact springs 56, 57 remains closed. The servomotor 98 is started again because its circuit is completed via conductor 53, contact springs 56, 57, conductor 55, switch contacts a2, b2 and a3, b3, conductor 76 and switch S7. The shaft 18 drives the cams 84, 86, 88, 90 and 94 so that the indices C move toward the respective contacts "1". Furthermore, the shaft 18 causes cams within the roller 20 to pivot which, in turn, causes buttons 2 and 3 via levers 7 and 8 to reset. Thus, the tape recorder is at a standstill. However, and since the circuit of the servomotor 98 remains completed after the indices C move beyond the contacts "1" of the respective switches because the lobe 94A of the cam 94 closes the associated switch S11, the shaft 18 continues to rotate the cams within roller 20 and causes two cams in the roller 20 to actuate the buttons 2 and 5 by way of the respective levers 7 and 9. The switch S4 continues to connect the motor 99 with the energy source Uo. The servomotor 98 is in operation while the indices B and C move beyond the index "O" until the indices D move into register with the index "O". At such time, the cams within the roller 20 cause the stop button 2 and the rewind button 5 to be depressed. In the meantime, the switch including the contact springs 56 and 57 opens; however, the switch S11 remains closed. The motor 99 rapidly rewinds the tape 199 so that the detector carriage 35 moves away from the storage carriage 34. The switch including the springs 56, 57 opens as a result of such movement of the detector carriage 35 because the storage carriage 34 is held by the blocking bar 42. The switch S11 opens when the index D on the cam 94 moves into register with the index "O", i.e., the servomotor 98 is arrested. The switch S8 is closed at the same time by the lobe 88A of the cam 88, i.e., the conductor 92 is connected with the conductor 51. However, the conductor 92 is not connected with the energy source Uo because the detector carriage 35 is still in the process of returning to its starting position. The rapid rewinding operation continues until the detector carriage 35 closes the switch S5 (switch 45). The servomotor 98 is started again when the detector carriage 35 reassumes the starting position because the switch S10 is actuated by actuating means 98 as a result of closing of the switch S8 shortly before that position of the cam 88 when its index D registers with the index "O". The servomotor 98 rotates the cams so that the index A returns into register with the index "O". This results in release of the button 2 and of the button 5.

The switch S8 continues to energize the actuating means 96 while the index D move beyond the index "O" (see the position of the lobe 88A). The switch S6 is closed when the index A registers with the index "O" so that the servomotor 98 continues to rotate the shaft 18 even though the lobe 88A allows the switch S8 to open. This starts the new playback cycle because the cams within the roller 20 depress the button 2 and the button 3. The same procedure is repeated, again and again, until the user decides to depress the off knob 68.

Figure 5A:
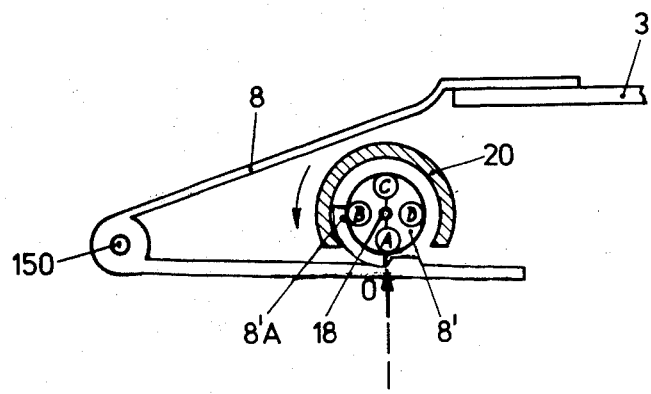
FIGS. 5A–5C are cross-sectional views of cams to actuate operator keys in the embodiment of FIG. 5.
Figure 5B:
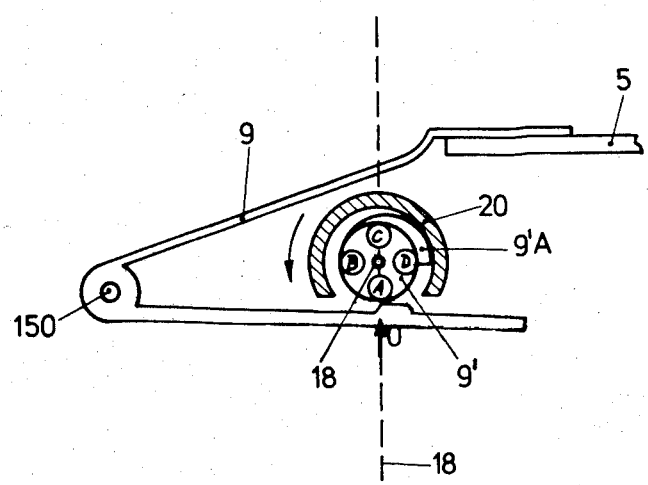
Figure 5C:
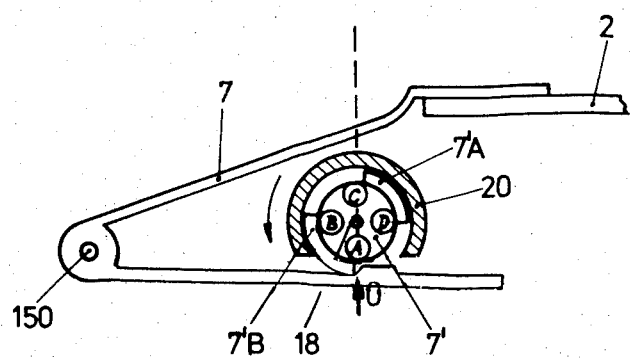

FIGS. 5A, 5B and 5C show respective cross-sections through the roller 20 of FIG. 1 with the corresponding cams and lobes to actuate the levers 7, 8 and 9. In these figures the cams act on the lower lever parts and not as shown in FIG. 1 on the upper ones which is purely a matter of construction. As can be seen from FIG. 5A a playback cam 8' is fixed on the shaft 18 within the roller 20. A lobe 8'A actuates, i.e., depresses playback button 3 as soon as the cam 8' depasses with the index "A" the reference position "O".

According to FIG. 5B a cam 9' with a steadily rising lobe 9'A activates rewind button 5 by means of the lever 9 so that rewind button 5 is steadily depressed when the cam 9' rotates from a position where its index "B" leaves the reference position "O" until its index "D" reaches the mentioned reference position "O".

According to FIG. 5C the stop button 2 is depressed by means of lever 7 and a cam 7' with two lobes 7'A and 7'B. Lobe 7'A depresses button 2 when the cam 7' moves from a position where the index "C" moves beyond reference position "O" towards the position where the index "D" is in position "O".

Lobe 7'B in its turn depresses button 2 when the index "A" leaves the reference position "O" until the index "B" has left the mentioned reference position "O". Actuation of the buttons 2, 3 and 5 according to the FIGS. 5A, 5B and 5C corresponds with the representation in the above mentioned table.

If the user wishes to change the length of that portion of the tape which is eventually already being repeated, the knob 52 is depressed again to disengage the blocking bar 42 from the storage carriage 34. The spring 43 then immediately propels the storage carriage 34 against the detector carriage 35. The resulting disengagement of the contact a1 from the contact b1 of the switch S1 does not influence the condition of the switch S2 because the holding circuit e2, f2 of the switch S2 remains completed.

The conductor which connects the contacts c2 and e2 of the switch S2 contains a diode D. On the other hand, the contact b1 of the switch S1 is directly connected with the contact c2 of the switch S2. Thus, when the contact b1 moves away from the contact a1 on depression of the knob 52, the contact c2 continues to engage the contact d2. However, the switch S3 cannot remain closed via holding circuit including the contacts e2 and f2 because the direction of current flow in the branch which contains the diode D cannot be reversed, due to action of diode D. Thus, the switch S3 opens and the conductor 76 is disconnected from the energy source Uo in spite of the fact that the contact spring 56 engages the contact spring 57.

If the starter knob 52 is actuated during rewinding, the operation is not immediately influenced because the switch S5 closes on completion of rewinding and the switch S8 then completes the circuit of the servomotor 98. The servomotor 98 continues to rotate the cams 84, 86, 88, 90 and 94 until the index A moves beyond the index "O" (i.e., when the switch S8 opens and the switch Se closes). This entails depression of the button 2 and of the button 3 so that the tape recorder reproduces the intelligence which is recorded on the selected portion of the tape. If the user continues to depress the starter knob 52, the playback continues without interruption, even though the switch S7 closes when the index B moves into register with the index "O", because the conductor 76 is disconnected from the energy source Uo. The conductor 76 is connected with the energy source Uo when the starter knob 52 is released, i.e., when the switch S3 closes. This initiates the rewinding of tape and renewed playback of the freshly selected portion of recorded intelligence. It will be seen that, by manipulating the knob 52, the user can shorten or lengthen the tape portion bearing intelligence which is to be reproduced while the starting point remains unchanged.

If the user actuates the off knob 68 during any selected stage of a cycle, the coupling crown 12 is moved away from the corresponding spindle 17 and the gear 24 is moved away from the gear 30. Furthermore, the contact c1 is disengaged from the contact d1 to disconnect the conductor 49 from the energy source Uo. The switches S2, S3 and S4 open to disconnect the energy source Uo from the contacts "1" of the corresponding switches S6, S7 and S8. Opening of the switch S4 results in connection of conductor 82 to switch S9 with the energy source Uo. Consequently, the circuit of the servomotor 98 is completed. The motor 99 is arrested in response to opening of the switch S4. Thus, the tape is arrested in that position to which it was moved at the time when the user decided to depress the off knob 68. As explained above, the spring 70 insures that a short-lasting depression of the off knob 68 suffices to arrest the motor 99. The off-knob 68 is thus preferably a key. The switch S9 is closed and causes the servomotor 98 to rotate the shaft 18 until the index. A returns into register with the index "O". As shown in the table, all of the buttons 2, 3 and 5 are then in the normal, i.e., released positions (H).

The servomotor 98 is arrested in response to opening of the switch S9. At the same time, the switch S10 reassumes the position which is shown in FIG. 5 whereby the circuit of the motor 99 is completed via conductor 100. Thus, the tape recorder is ready for normal operation or for operation in the aforedescribed manner. All the user has to do is to depress the knob 52 at the moment when the playback of a desired amount of recorded intelligence begins, for example (but not necessarily), at the locus which has been selected by depression of the off knob 68. This enables the user to repeatedly reproduce intelligence immediately following the last reproduction of intelligence which has been reproduced a desired number of times during the preceding operation of the tape recorder. In other words, the user can learn a language or memorize other types of recorded intelligence (e.g., music, a script or the lyrics of a song) by repeatedly listening to successive amounts of intelligence which is recorded on the tape.

The improved attachment is especially suited for use by students. The feature that the repetition cycle can be started and terminated by the simple expedient of actuating two knobs (52 and 68) is desirable and advantageous because the student need not devote much attention to manipulation of the mechanism which initiates repeated reproduction of one and the same amount of recorded intelligence. In other words, the student can concentrate on the contents of intelligence because the manipulation of controls is much too simple to be fascinating and therefore a cause of distraction. In addition, the apparatus can be used as a conventional tape recorder. As mentioned above, the apparatus which is shown in FIGS. 1 to 5 further enables the user to shorten or lengthen the tape portion containing intelligence which is to be reproduced twice or more than twice. Also, the student can readily memorize or otherwise gain information from successive portions of intelligence which is stored on the tape. This can be achieved without wasting time to locate the end of the passage which was repeatedly reproduced during the preceding use of the tape recorder. Thus, the attachment enables the user to insure that the freshly selected amount of intelligence to be reproduced twice or more than twice immediately follows the end of the preceding amount of (repeatedly reproduced) intelligence.

The coupling between the cassette 15 and the attachment 10 is preferably designed in such a way that the cassette cannot be removed from the chamber 14 while the coupling crown 12 engages the corresponding spindle 17. This insures that accidental actuation of the eject button for the cassette does not result in actual ejection of the cassette from the chamber 14 prior to depression of the off knob 68. If the attachment 10 does not constitute a cover for the cassette in the chamber 14, the eject button can serve to open a discrete lid for the cassette and to expel the cassette from the chamber. The configuration (see 12a of FIG. 13) of the end face of the coupling crown 12 insures that the crown 12 can receive torque from the corresponding spindle 17 even if the attachment 10 is equipped with a relatively weak spring 28.

It is further within the purview of the invention to modify the apparatus of FIGS. 1 to 5 in a number of ways. For example, the cams of roller 20 can be replaced with magnetic switches or solenoids. Furthermore, the servomotor 98 and the cams which receive motion from the servomotor 98 can be replaced by relays or other suitable electrical components. The switches may constitute electromechanical relays or semiconductor switches, e.g., digitally actuated analog switches, which is shown by the representation of coil-symbols and driver symbols within the switch actuating units as 72, 74 etc.

Figure 6:
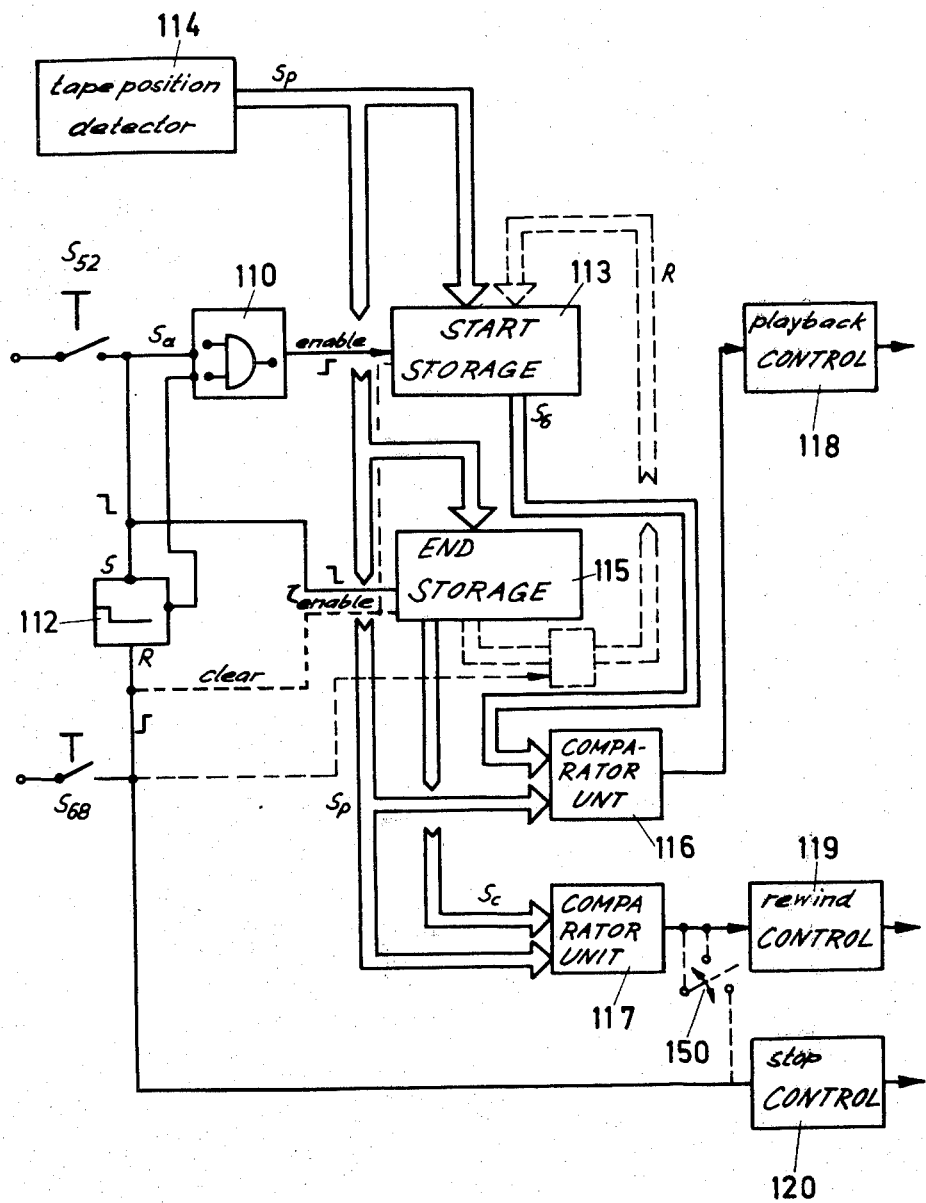
FIG. 6 is a functional block diagram of the apparatus.

FIG. 6 shows a functional block diagram with the principles of functioning of the described apparatus. By actuating knob 52, here shown as switch $S_{52}$, a signal $s_a$ is produced which is led via an AND unit 110 to a start position storage 113. A detector 114 which detects the position of the carrier, e.g., the tape position, provides a signal $s_p$ which is led to the start position storage 113 and which is loaded into the start position 113 on occurrence of the rising edge of signal $s_a$, i.e., on occurrence of a first signal state caused by switch $S_{52}$. This first signal state is caused by depressing switch $S_{52}$.

By a second signal state, e.g., the falling edge of signal $s_a$ caused by releasing switch $S_{52}$ the output signal of tape position detector 114 is loaded into the end position storage 115. To prevent that a subsequent actuation of switch $S_{52}$ may alter the value loaded into start position storage 113 by means of its first switching stage, e.g., by means of the rising signal edge, the AND unit 110 is then disabled by means of a bistable unit 112 after the first occurrence of the first signal state. This bistable unit 112 is set by the first actuation of $S_{52}$ and thus prevents by means of AND unit 110 afterwards a change of the value loaded and stored within start position storage 113. AND-unit 110 is connected with an output of unit 112 which goes "low" when set. After switch $S_{52}$ has thus been released a start position value is stored as well as an end position value within the storages 113, 115 respectively. The output of the start position storage 113 is led on the first comparator unit 116, the second input of which is connected to the output of the tape position detector 114 and thus is its output signals $s_p$. Analogically, the output of end position storage 115 is connected to a second comparator unit 117, the second input of which again is connected with the output of tape position detector 114 and thus receives its output signal $s_p$. If the output signal $s_p$ of the detector 114 matches the value stored within the start position storage 113, comparator unit 116 activates a playback control unit 118 by a first control signal which switches the machine into playback operation. When the output signal of the tape position detector 114 matches the value stored within the end position storage 115 the comparator unit 117 acts with a second control signal on a rewind control unit 119 which latter switches the machine into rewind operation.

By activation of the schematically shown off-switch $S_{68}$ the bistable unit 112 is reset and a stop control unit 120 is activated which switches the machine into stop operation. Actuation of off-switch $S_{68}$ may also clear start position storage 113 and end position storage 115.

From the functional block diagram of FIG. 6 it is obvious that the apparatus can be realized in many ways. The signals shown in FIG. 6 can be electrical or mechanical signals and accordingly the signal processing units will be mechanical or electronic units. A mechanical realization has been described with reference to the FIGS. 1 to 5. An electronic realization will be described later.

An important feature of the control is that a start position value as well as an end position value are set and hold by actuation of a single knob, of knob $S_{52}$. By subsequent activation of this knob the end position value may be altered. Mere activation of the off-switch renders it possible to alter the start position value according to the start position of the tape sequence to be repeated. Thereby, either a value corresponding to the carrier position at the moment of activating off-switch $S_{68}$ is used as a new start position value or the previously stored end position value is used as new start position value depending on which time sequence is selected to activate off-switch $S_{68}$ and subsequently knob $S_{52}$. As will be described the storages may be realized by use of electronic e.g., digital storage means.

In the apparatus described in FIGS. 5 and 5A to 5C, which is a mechanical realization of the generic embodiment according to FIG. 6 the start position storage is realized by contact $b_5$, the position of which along the movement path of detector carriage 35 being defined as start position as soon as knob 52 is depressed. The end position storage is realized by storage carriage 34 whereby its arresting position along said path represents the stored end position value. The detection of the tape position and the conversion of this position into a physical value which may be stored by the installed storages is performed by the gear train 24 to 33 and by the counter-like oscillating detector carriage 35. The comparator units 116 and 117 according to FIG. 6 are there realized by switch 45 ($a_5$, $b_5$) on one hand and by a switch 56, 57 on the other hand. Both contact pairs execute control functions as soon as the stored position values match with the values according to the momentary position of detector carriage 35. The control units 118, 119 and 120 are realized according to FIGS. 1 to 5 by the lever/cam arrangement acting on the buttons 2,3 and 5 of the machine 1.

Figure 7:
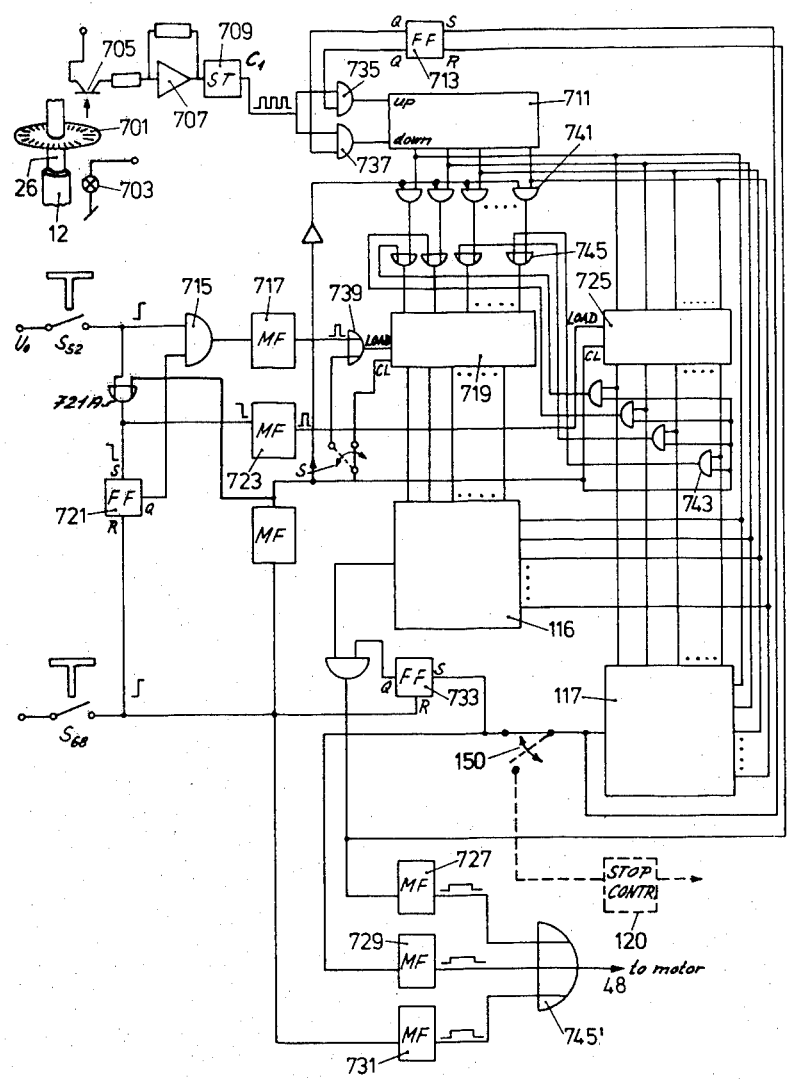
FIG. 7 is an electronic circuitry as electronic realization of the functional block diagram according to FIG. 6.

FIG. 7 shows an electronic apparatus as electronic realization of FIG. 6. Mounted on the axis 26 which carries the coupling crown 12 is a coded disc 701 which is provided with a ring of slots or segments which have a light transmission ratio different from segments or bridge parts separating these segments. An optical emitter 703, e.g., a LED-diode transmits a light beam through the coded disc 701 onto a photo-electrical converter which is, e.g., formed by a photo-transistor 705. Rotation of the coded disc 701 subsequently causes to be interrupted or transmitted the light beam so that each incremental movement of disc 701 provides an electrical pulse of a pulse train which is amplified by an amplifier 707 and shaped by a pulse shaper unit 709, e.g., by a Schmitt trigger. Thus, at the output of Schmitt trigger 709 electrical impulses occur according to the rotational path covered by the coded disc 701 and thus by axis 26. These electrical impulses are fed to an electronic digital counter 711, preferably an up-/down-counter the count-direction of which is controlled by a bistable multivibrator or flip-flop 713 as will be described. On depression of the schematically shown knob $S_{52}$, a rising signal edge is produced which is led via an AND-gate 715 on a mono-stable multivibrator 717 which latter provides a single pulse which is led on the load input of a storage 719 which is the start position storage. The storage 719 loads due to action of mono-stable multivibrator 717 a digital value which momentarily appears at the outputs of the digital counter 711. A further bistable multivibrator 721 is set by the falling edge which is produced on release of switch $S_{52}$ and thus disables by means of AND-gate 715 a further rising edge to trigger monostable multivibrator 717 again. Thus, no further impulse will occur on the load input of start position storage 719.

On release of knob $S_{52}$, i.e., when the second signal state occurs, e.g., the falling edge of that signal, a further monostable multivibrator 723 is triggered producing a single impulse which is led on the load input of end position storage 725. This storage is then loaded by digital values occurring at the outputs of counter 711 which represents the momentary position of the tape. After knob $S_{52}$ has been released a start position value stays loaded within storage 719 whereas an end position value stays loaded in storage 725. These stored values in storages 719 and 725 are led respectively to input-sets of a comparator unit 116 as well as of a comparator unit 117, a second input set of these comparator units being connected to the output set of counter 711. The comparator units 116 and 117 perform a bit by bit comparison of the digital storage output datas and the digital counter output datas by means of logic gates. It is clear for every skilled man used to working with logic circuitry how to connect logic gates to perform a bit by bit comparison so that the circuitry of comparator units 116 and 117 is not further described.

The first comparator unit 116 produces a first control signal at its output as soon as the stored start position value in storage 719 matches with a momentarily occurring output value of counter 711. The output signal of comparator unit 116 is led to a mono-stable multivibrator 727 which produces a single impulse of pre-selectable pulse width. As soon as the momentary output data of counter 711 match with the stored end position value in storage 725, the second comparator unit 117 produces a second control signal which is led to a further monostable multivibrator 729 which produces a single impulse of pre-selectable pulse width.

Actuation of the off-switch $S_{68}$ reset bistable multivibrator 721 and may possibly, by means of a further monostable multivibrator, clear start position storage 719 as well as end position storage 725. Depression of off-switch $S_{68}$ further causes, by triggering a further monostable multivibrator 731, the production of a third single impulse of pre-selectable pulse width.

As in the mechanical analogue of FIG. 5 in the apparatus of FIG. 7 a first actuation of knob $S_{52}$ causes a first signal state to occur. This first signal state is according to FIG. 7 the rising edge of the output signal of switch $S_{52}$ whereas this first signal state in FIG. 5 is the depressed mechanical position of said switch. By a second actuation, release of switch $S_{52}$, a second signal state is provided, according to FIG. 7 the falling edge of the switched signal, according to FIG. 5 by returning to the released mechanical position. The following table shows the analogy of mechanical and electronic realization according to FIG. 5 and FIG. 7 respectively, based on the generic function blocks of FIG. 6.

| Function block | mechanical realization (FIG. 5) | electronic realization (FIG. 7) |
| --- | --- | --- |
| start position storage 113 | contact $b_5$ | storage 719 |
| end position storage 115 | storage carriage 34 | storage 725 |
| AND -unit 110 | logical connection: start value settable, if $S_{52}$ is actuated, AND previously $S_{68}$ was actuated. | AND gate 715 |
| position detector 114 | axis 26, gear train inclusively detector carriage 35 | coded disc 701 etc. inclusively counter 711 |
| $s_a$ | depression of switch 52 | rising signal edge as result of depressing $S_{52}$ |
| $s_p$ | position of detector carriage 35 | output of counter 711 |
| bistable unit 112 | maintenance of coupling crown 12 coupled to spindle 17; release by actuation of switch 68 | bistable multivibrator 721 |
| comparator unit 116 | contact pair $a_5$, $b_5$ | logic circuitry |
| comparator unit 117 | contact 56, 57 | logic circuitry |
| playback control unit 118 | cam/lever arrangement for 8 solenoid/lever arrangement for 8 | |
| rewind control unit 119 | cam/lever arrangement for 9 solenoid/lever arrangement for 9 | |
| stop control unit 120 | cam/lever arrangement for 7 solenoid/lever arrangement for 7 | |

When the knob $S_{52}$ according to FIG. 7 is actuated the first time the data led to start position storage 719 match in fact with the output data of counter 711. Thus, at this moment the first control unit 116 would produce its first control signal as the input data of storage 719 practically instantaneously appear at its output. This could eventually lead to mal-function of the apparatus. This is prevented by the fact that the second control signal produced by the second control unit 117 which only is produced for a first time as soon as knob $S_{52}$ is released, i.e., on occurrence of the second signal state, is used to disable comparator unit 116 by means of a bistable multivibrator 733 which is reset as long as the second comparator unit 117 has not produced its second control signal. Thus, the first occurring first control signal of control unit 116 will not be effective as regards control function. On release of knob $S_{52}$ the second comparator unit 117 instantaneously produces at its output the second control signal because at this instant the data led to the inputs of storage 725 and practically instantly appearing at its outputs are the same as the output data of counter 711.

The bistable multivibrator 713 controls the count direction of counter 711. Before the second control signal at the second comparator unit 117 occurs the bistable multivibrator 713 is reset, its $\overline{Q}$ output is thus high so that a AND gate 735 leads the detector output impulse train on the up-count clock input of counter 711. At this time the Q output of bistable multivibrator 713 is low and prevents admission of the impulse train to the down-count clock input of counter 711. As soon as the second control signal is produced by control unit 117, the bistable multivibrator 713 is set which causes the signal at its $\overline{Q}$ output to drop and at the Q output to rise so that now the impulse train at the output of the detector (701, 703, 705, 707, 709) is led via AND gate 737 to the down-count clock input, whereas the up-count clock input is disabled by action of AND gate 735. By actuating off-knob $S_{68}$ the storages 719 and 725 may be cleared. In any event this actuation renders it possible that a further occurrence of the first signal state produced by knob $S_{52}$ loads a new value into start position storage 719 or, in mechanical analogue, renders it possible that the position of contact $b_5$ is defined as the start position value for a subsequent sequence to be repeated (FIG. 5).

By actuation of off-switch $S_{68}$ the machine is stopped by means of the action of monostable multivibrator 731 in the embodiment of FIG. 7.

It may be advantageous, e.g., by means of a switch S or by means of fixed connections to transfer the previously stored end position value into the start position storage 719 when activating the off-switch $S_{68}$. Then a tape sequence subsequently to be repeated will start exactly at that position which was the end position of the sequence previously repeated independently of the moment at which the off-switch $S_{68}$ was actuated during repetition of the previous repetition cycle. This is realized by the fact that the signal switched by off-switch $S_{68}$ is led to a monostable multivibrator, the single impulse produced at its output being led via OR-gate 739 to the load input of start position storage 719. The output of the mentioned monostable multivibrator is further led to AND gates 743 which make it possible for the output data of end position storage 725 to be led via OR-gates 745 to the inputs of start position storage 719. The inverted output signal of the mentioned monostable multivibrator is led to AND gates 741 so that the output signals of counter 711 are led to the inputs of storage 719 as long as no impulse occurs at the monostable multivibrator's output. The bistable multivibrator 721 is set in this case by means of an OR-gate 721A.

Pre-selection of the impulse width emitted from monostable multivibrators 727, 729, 731 which are led via an OR-gate 745' the motor 98 is controlled to rotate the shaft 18 and the cams fixed thereon to actuate the before described levers. The width of the emitted impulses in chosen according to the rotational path covered by the shaft 18 to cause the cams to properly activate the associated levers.

Figure 8:
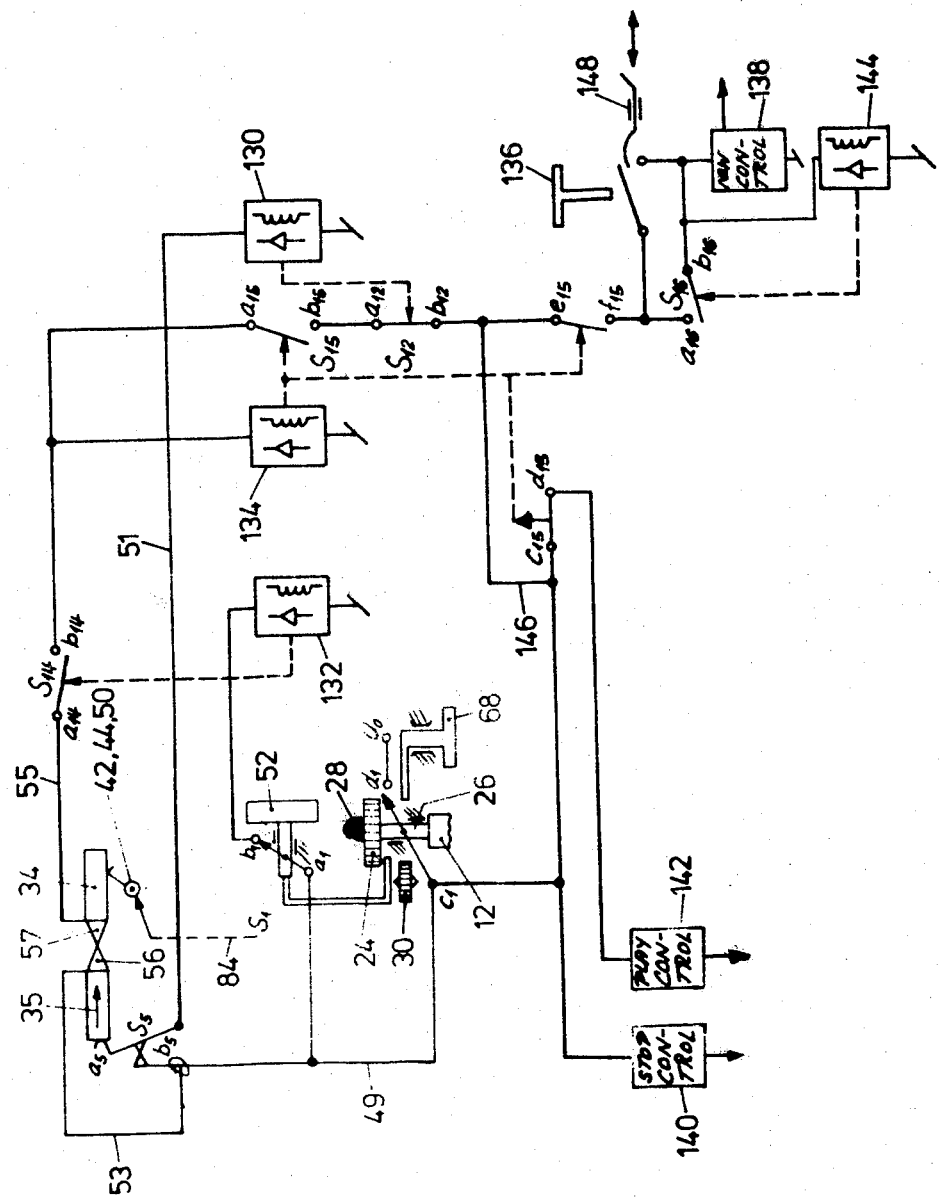
FIG. 8 is a diagrammatic view of a second apparatus.

FIG. 8 illustrates a further mechanical embodiment of the apparatus. All such parts of this apparatus which are identical with or clearly analogous to corresponding parts of the structure shown in FIG. 5 are denoted by similar reference characters. The apparatus of FIG. 8 exhibits the additional feature that the user can decide, after relaxation or termination of pressure upon the starter knob 52, whether or not the intelligence on the selected portion of the tape is to be reproduced once or more than once.

The contact b1 of the switch S1 is connected with actuating means 132 for a switch S14 including contacts a14 and b14. The contact a14 engages the contact b14 when the actuating means 132 is energized. The switch S14 then connects the conductor 55 with the control input of actuating means 134 for a switch S15. When the actuating means 134 is energized, the contact a15 of the switch S15 engages the contact b15 and the conductor 55 (which is connected to the cable clamp on the carriage 34) is connected with the contact a12 of a further switch S12. The actuating means 130 for the switch S12 has a control input which is connected with the conductor 41, i.e., with the contact a5 of the switch S5. The arrangement is such that, when the actuating means 130 is energized, the contact a12 of the switch S12 is disengaged from the contact b12. The contact b12 is directly connected with the conductor 49 via conductor 146. Furthermore, the contact b12 is directly connected with the contact e15 of the switch S15. The contact e15 is engaged with a contact f15 of the switch S15 when the latter is closed. The contact f15 is connected with a rewind control circuit 138 for the rewind button of the machine when the user depresses a repeater knob 136. The control circuit 138 is serially connected with actuating means 144 for a switch S16 which closes so that its contact b16 engages the contact a16. This completes a holding circuit for the control circuit 138.

The contacts c15, d15 of the switch S15 are disengaged when the actuating means 134 for the switch S15 is energized. The contact c15, d15 normally connects the conductor 49 with a control unit 142 for playback operation of the tape recorder. The control unit 140, which is connected with the conductor 49, controls the stop button of the tape recorder.

The repeater knob 136 is coupled with an arresting lever 148 so that the repeater knob 136 is arrested in its depressed position. By pushing the lever 148 in left-hand direction after the repeater knob 136 having been depressed, the latter is held in its depressed position and will be released by shifting the lever 148 again into the right-hand position of FIG. 8. Depression of repeater knob 136 for a short time causes the selected tape sequence to be repeated once. Arresting the repeater knob 136 in its depressed position causes the selected tape sequence to be repeated until the lever 148 is shifted to the right-hand side and releases the repeater knob 136.

The operation of the apparatus of FIG. 8 is as follows:

When the user depresses the starter knob 52, the contact a1 is disengaged from the contact b1 and the actuating means 132 is deenergized to open the switch S14. The shaft 26 is free to move the coupling crown 12 into engagement with the corresponding spindle 17 and the gear 24 moves into mesh with the gear 30. Thus, the gear 30 can cause the detector carriage 35 to move from the starting position and the detector carriage 35 moves the storage carriage 34. The axis 26 allows the contact c1 to engage the contact d1 so that the conductor 49 is connected with the energy source U0. This actuates the control unit 140 which depresses the stop button (2 in FIG. 1). Since the actuating means 134 is deenergized, the contacts of the switch S15 are held in the illustrated positions, i.e., the contact a15 is disengaged from the contact b15 and the contact c15 engages the contact d15. Thus, the conductor 49 is connected with the control unit 142 which depresses the playback button of the tape recorder. The tape recorder begins to reproduce intelligence on the tape. As the detector carriage 35 leaves its starting position, the switch S5 opens to denenergize the acutating means 130 whereby the switch S12 closes. The knob 52 continues to dwell in the depressed or operative position and the playback also continues until the user decides to terminate the playback by releasing the knob 52 which results in engagement of the contact a1 with the contact b1. The actuating means 132 is energized to close the switch S14. This results in energization of actuating means 134 via conductors 49, 53, contact springs 56, 57 and conductor 55. The switch S15 is actuated to move the contacts a15, e15 into engagement with the contacts b15, f15 and to disengage the contact c15 from the contact d15. Thus, the contact f15 is connected with the energy source. Disengagement of contacts c15, d15 results in deenergization of the control unit 142 which allows or causes the playback button to assume its idle position.

In contrast to the previously described embodiments, the apparatus of FIG. 8 is now in a condition to enable the user to decide whether or not the intelligence on selected portion of the tape should be reproduced once or more than once, or whether or not the user wishes to change the length of that portion of the tape which is to be repeated. Thus, the tape recorder is idle until the user reaches one of the just discussed decisions. If the user decides upon a single repetition, he or she actuates (depresses) the repeater knob 136 for a short interval of time so that the energy source U0 (which is already connected with the contact f15 of the switch S15) is connected with the control unit 138 as a result of depression of the knob 136. At the same time the actuating means 144 is energized (serial connection 138,144) which closes the switch S16 so that the control unit 138 remains energized even after the knob 136 is released. The control unit 138 actuates the rewind button of the rape recorder so that the tape is transported toward and is collected by the takeup reel of the cassette. The detector carriage 35 moves away from the storage carriage 34 and the switch including the contact springs 56, 57 opens to disconnect the conductor 55 from the energy source U0. The actuating means 134 remains energized because the switch S12 is closed when the actuating means 130 is deenergized (during rewinding) and the contact a15 of the switch S15 engages the contact b15. The contact e15 continues to engage the contact f15 to insure that the rewinding operation can be completed. When the detector carriage 35 reaches its starting position, the switch S5 closes to energize the actuating means 130 which opens the switch S12. Therefore, the actuating means 134 is deenergized and the contacts a15, e15 and c15 of the switch S15 assume the positions shown in FIG. 7. The control unit 138 is deenergized on disengagement of the contact e15 from the contact f15 and the rewind button is released. The holding circuit including the switch S16 is also deenergized. Since the contact c15 engages the contact d15, the control unit 142 depresses the playback button so that the selected portion of intelligence is reproduced in response to return movement of detector carriage 35 to its starting position. The contact springs 56, 57 connect the conductors 53, 55 with each other upon completion of playback so that the actuating means 134 is energized and changes the condition of the switch S15 (the switch S14 is then closed), i.e., the contacts a15, e15 respectively engage the contacts b15, f15 and the contact c15 is disengaged from the contact d15. This interrupts the operation of the tape recorder but the contact f15 remains connected with the energy source U0.

If the user desires repeated playback of one and the same portion of the tape, he or she actuates a detent device or jack 148 while the repeater knob 136 is depressed whereby the device 148 maintains the knob 136 in the operative or depressed position. This means that, whenever the contact spring 56 engages the contact spring 57, i.e., whenever the detector carriage 35 returns into engagement with the storage carriage 34, a further repetition cycle begins automatically. This goes on as long as the detent device 148 holds the knob 136 in depressed position.

The apparatus of FIG. 8 also allows for shortening or lengthening of the tape portion on which the intelligence is to be reproduced once or more than once. Thus, the knob 52 can be depressed (for example, during rewinding) to thereby open the switch S14. However, the actuating means 134 remains energized, in spite of opening of the switch S14, in the aforedescribed manner (the switch S12 is closed when the actuating means 130 is deenergized and the holding circuit for actuating means 134 is completed via contacts a15, b15). Thus, the rewinding operation continues. Each depression of the knob 52 results in deactivation of the blocking bar 42 for the storage carriage 34 so that the latter is propelled on the detector carriage 35. When the rewinding is completed, the switch S12 is opened because the actuating means 130 is energized. The holding circuit for the actuating means 134 opens and the contacts of the switch S15 reassume the positions of FIG. 8. The rewind button is released by the control unit 138 because the contact e15 is disengaged from the contact f15. The contact c15 engages the contact d15 so that the control unit 142 depresses the playback button of the tape recorder. The user can decide to release the knob 52 and to thus terminate the playback at any desired point, i.e., the amount of intelligence which is to be reproduced can but need not match the amount of the previously reproduced intelligence. When the knob 52 is released, the switch S14 closes, the actuating means 134 is energized and the switch S15 is actuated to open the portion c15, d15 and to close the portions a15, b15 and e15, f15. Thus, the contact f15 is connected with the energy source U0 and the user is free to select the number of repetitions by depressing the repeater knob 136 for a short interval of time (single repetition) or by depressing the knob 136 and thereupon actuating the detent device 148 to maintain the knob 136 in depressed position.

If one compares the apparatus of FIGS. 6 and 8, it will be noted that the provision of the knob 136 of FIG. 8 is tantamount to placing a switch 150 (shown in FIGS. 6 and 7 in dashed lines) at the output of the comparator unit 117 by means of which the output of unit 117 is only connected to the rewind control unit 119 when the operator wants to start a repetition cycle.

Each of the control units (such as 118, 119, 120 of FIG. 6 and 140, 142, 138 of FIG. 8) may comprise an inductance with a moving core (a solenoid) which is displaced when the circuit of the inductance is completed to actuate the respective buttons 2, 3, 5 of the machine.

In the embodiments of FIGS. 1–5 and 8, each actuation of the knob 68 entails automatic storage of a value denoting the position of intelligence in the moment of actuation as the start position value for a sequence to be subsequently set. In other words, and in contrast to operation of the apparatus of FIG. 7 (without switch 150), the next repetition need not begin starting with that portion of tape according to the stored end position value of the previous repetition sequence.

As is shown in the functional block diagram of FIG. 6 the output signal of the end position storage 115 may be fed back by means of signal lines controlled by off-switch $S_{68}$ to the input of the start position storage 113 as soon as the off-switch $S_{68}$ is actuated. By this feature the value according to the end position of a previous repetition sequence is loaded into the start position storage as a value denoting start position of a repetition sequence subsequently to be set.

Figure 8A:
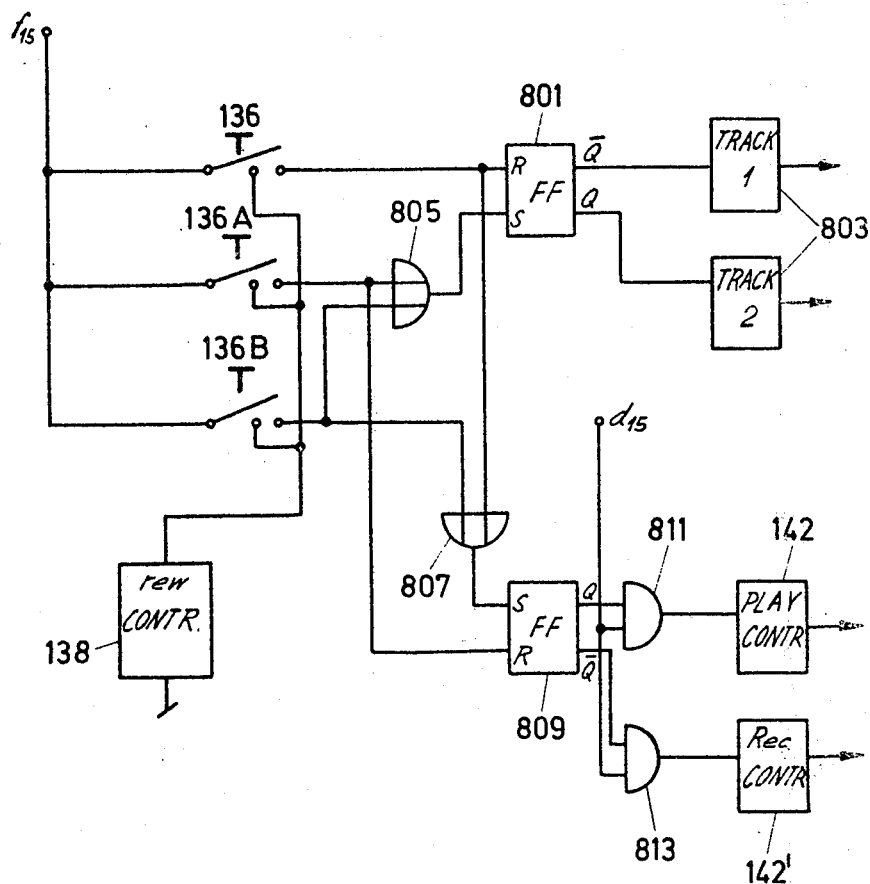
FIG. 8A is an additional circuitry for the apparatus of FIG. 8 for additional control operation.
Figure 14:
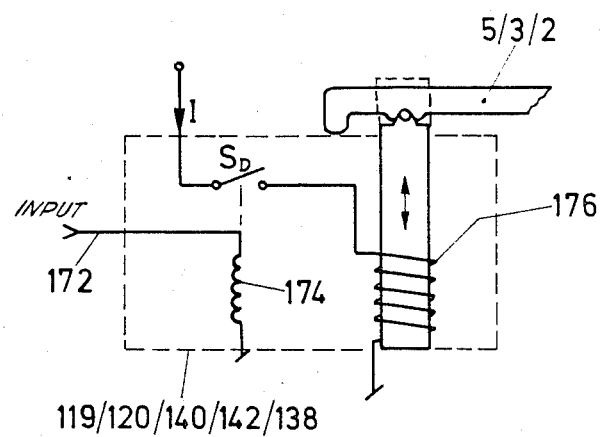
FIG. 14 is a diagrammatic view of an actuating unit for the control means of the machine controlled by the improved apparatus.

FIG. 8A shows an additional electric circuitry for the apparatus of FIG. 8. The repeater knob 136, as shown in FIG. 8 and FIG. 8A is provided again with a holding lever (not shown in FIG. 8A) for holding knob 136 in its actuated, i.e., depressed position. The knob 136 connects the contact $f_{15}$ of FIG. 8 with the reset entry R of a bistable multivibrator 801, the $\overline{Q}$ output of which is led to a track select control unit 803 of the tape recorder. Activation of $\overline{Q}$ output by means of resetting bistable multivibrator 801 controls the tape recorder into "track-1-operation". The Q output of the bistable multivibrator 801 controls the tape recorder via control unit 803 into "track-2-operation". A switch of a further knob 136A is on one hand connected to the contact $f_{15}$ of FIG. 8 and to one input of an OR gate 805 on the other hand, the output of OR-gate 805 being led to the set inputs of the bistable multivibrator 801. The second input of the OR-gate 805 is connected via a further switch actuatable by a further knob 136B again to contact $f_{15}$ of FIG. 8. On actuation of either one of the knobs 136, 136A and 136B the rewind control unit 138 according to FIG. 8 is activated. The switch actuatable by knob 136B as well as the switch actuatable by knob 136 are further connected to the input of an OR-gate 807 the output of which is connected to the set input S of a further bistable multivibrator 809, the reset entry R of which is connected with the switch actuatable by knob 136A. The Q output of the bistable multivibrator 809 is connected to a first AND gate 811, whereas the $\overline{Q}$ output of multivibrator 809 is connected to an AND gate 813. The second entries of the AND gates 811 and 813 are connected to contact $d_{15}$ of FIG. 8. The output of AND gate 811 controls the playback control unit 142, whereas the output of AND gate 813 controls a record control unit 142'. The control units 142' and 803 can, as is shown in FIG. 1 by means of dashed lines, actuate a track select key 3A and a record control key 6 by means of actuating levers 8A and 6A, respectively, which are driven by means of solenoid arrangements 20A and 20B, respectively. The lay-out of the solenoid arrangement as an electro-mechanical driving means which may also be used for driving the stop button, rewind button and playback button is shown in FIG. 14.

The circuitry of FIG. 8A functions as follows Actuation of repeater knob 136 activates the rewind control unit 138 and thus controls the tape recorder for repetition as was described in FIG. 8. Via OR-gate 807 knob 136 further sets the bistable multivibrator 809 which results in enabling activation of the playback control unit 142. Thus, the tape recorder will be switched in playback operation as soon as the rewind cycle is terminated and the tape has reached the start position of the sequence to be repeated. Holding knob 136 in depressed position, e.g., by means of the arresting lever 148 results in a continuous repetition. Resetting of bistable multivibrator 801 by means of actuation of knob 136 results in switching the tape recorder into "track-1-operation" so that the sequence to be repeated is played back from track "1".

If the operator actuates the knob 136A instead of repeater knob 136, again the rewind control unit 138 is activated and the pre-selected tape sequence will be repeated as was described in FIG. 8. Because activation of knob 136A sets the bistable multivibrator 801, the tape recorder is switched into "track-2-operation", whereas resetting of bistable multivibrator 809 results in switching the tape recorder via record control unit 142' into record operation. Thus the tape recorder will be switched on track "2" and into record mode as soon as the rewind cycle is terminated, i.e., as soon as the tape has reached the start position of the sequence to be repeated. Now, e.g., a student has the possibility to record on track "2" a spoken text which may be the repetition of the just before heard "teacher text" on track "1". As the record control unit 142' holds the tape recorder in record mode until the end of the sequence to be repeated is reached all texts which were previously recorded on track 2 of the sequence to be repeated will be cleared so that only the latest recorded text will remain undisturbed on said track. If the student speaks too slowly the end of the text will not be recorded, i.e., that portion of the text which is spoken after the sequence has reached its end position. Thus, the student has the opportunity to control his fluency of speaking by the time limit set from the length of the sequence which is repeated.

Actuation of knob 136B again activates the rewind control unit 138 for a repetition cycle as was described in FIG. 8. Via OR-gate 805 actuation of knob 136B sets bistable multivibrator 801 so that the recorder is switched into "track-2-mode". Setting of bistable multivibrator 809 switches the tape recorder via AND gate 811 into playback mode so that actuation of knob 136B leads to repetition of the tape sequence playing back the text which was spoken onto "student track 2". As knob 136, knob 136B may also cooperate with an arresting or holding lever 148, as shown in FIG. 8 for knob 136, and the action of which having been described.

Provision of the additional knobs 136A and 136B gives the possibility that a student, after having listened to the text on "teacher track 1" may speak a text onto "student track 2". This text may be just the repetition of the "teacher text", e.g., in a foreign language, or it may be the answer to a question which was spoken by the teacher on "teacher track 1". The fact that the tape sequence provided for the student to speak the appropriate text is always limited by the start- and end-position obliges the student to speak his text in the pre-selected time span whereby a control of the fluency with which the student already speaks, e.g., in a foreign language is obtained.

Figure 9:
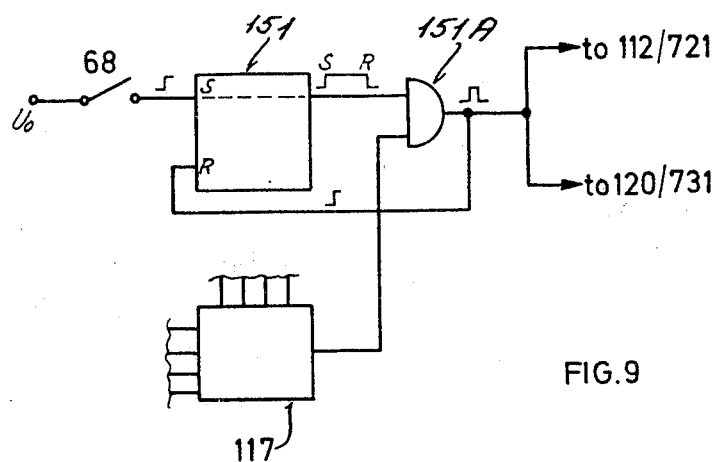
FIG. 9 is an electronic circuitry for facilitating the joining together of subsequent sequences to be repeated in an apparatus as shown in FIG. 6 or FIG. 7.

The circuitry of FIG. 9 gives the possibility of actuating the off-switch 68, ($S_{68}$) at any time during repetition of a tape sequence, whereby this actuation of off-switch 68, ($S_{68}$) only becomes effective when the tape has reached its end position during repetition. This circuit may be connected to the embodiment of FIG. 7 or to the general embodiment of FIG. 6. The switch 68 acts on a bistable unit 151, e.g., a bistable multivibrator, the output of which is connected via an AND gate 151A to the bistable unit 112 of FIG. 6 or 721 of FIG. 7 as well as to the stop control unit 120 of FIG. 6 or 731 of FIG. 7. The second input of AND gate 151A is connected to the output of comparator unit 117 (FIGS. 6 and 7). By actuation of switch 68 the bistable unit 151 is set. It is reset as soon as the comparator unit 117 produces its second control signal. Thus, bistable unit 112, e.g., bistable multivibrator 721 and stop control unit 120, e.g., monostable multivibrator 731 will only be activated at the end of a repetition cycle. As is shown in dashed line, the bistable unit 151 may be omitted which results in a situation where activation of off-switch 68, ($S_{68}$) will only become effective if at the same time the end position of the sequence is reached which is denoted by the comparator unit 117, producing then its second control signal.

Figure 10:
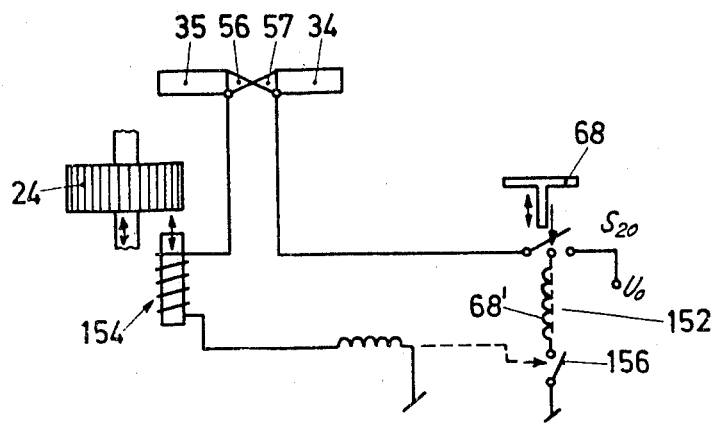
FIG. 10 shows a diagrammatic view of a modification of the apparatus as shown in FIG. 8 for facilitating the joining together of subsequent sequences to be repeated.

FIG. 10 shows how the off-switch 68 may be connected to realize the features described in FIG. 9. In combination with the mechanical embodiments shown in FIGS. 5 and 8, the off-switch 68 is serially connected with the switch 56, 57 on the respective carriages 35, 34 and further in series with the coil of a solenoid and an activating coil of a switch 156. By depression of switch 68 its contacts are bridged by contact bridge $S_{20}$ so that contact 57 on carriage 34 is connected to the energy source U0. As long as contact 57 does not contact its counter-part 56, the coil of solenoid 154 will not be energized and the switch 156 will remain in closed position. By depression of switch 68 and closing the switch 156, a holding coil 68' of a holding circuit 152 is activated which holds the contact bridge $S_{20}$ in closed position even if afterwards the switch 68 is released. As soon as afterwards the switch 56, 57 is closed the solenoid 154 is activated and pushes gear 24 out of mesh with gear 30 as well as coupling crown 12 out of mesh with spindle 17. Further the driving coil of switch 156 is then activated which causes the switch 156 to open and to disactivate the holding coil 68' for the contact bridge $S_{20}$. Thus, it may be seen that the switch 68 is serially connected with switch 56, 57 which in fact is a logic AND connection of these two switches. Switch 68 becomes, therefore, effective if its activated AND switch 57, 56 is closed which denotes the tape sequence having reached its end position. If the self-holding arrangement 152 with coil 68' is omitted the same functioning as shown in FIG. 9 when bistable unit 151 is omitted is realized.

By means of the features of FIG. 9 and FIG. 10 actuation of off-switch 68 will stop the tape recorder in the end position of the repetition sequence independently of the instant in which off-switch 68 has been depressed.

As was described before, the repeater knob 136 of FIG. 8 enables to control for single or more repetition cylces. By means of repeater knob 136 the operator may decide between following possibilities:
 (a) perform one or several repetitions
 (b) perform automatic repetitions over and over again
 (c) lengthen or shorten the repetition sequence selected
 (d) continue playback with repetition.

Figure 11:
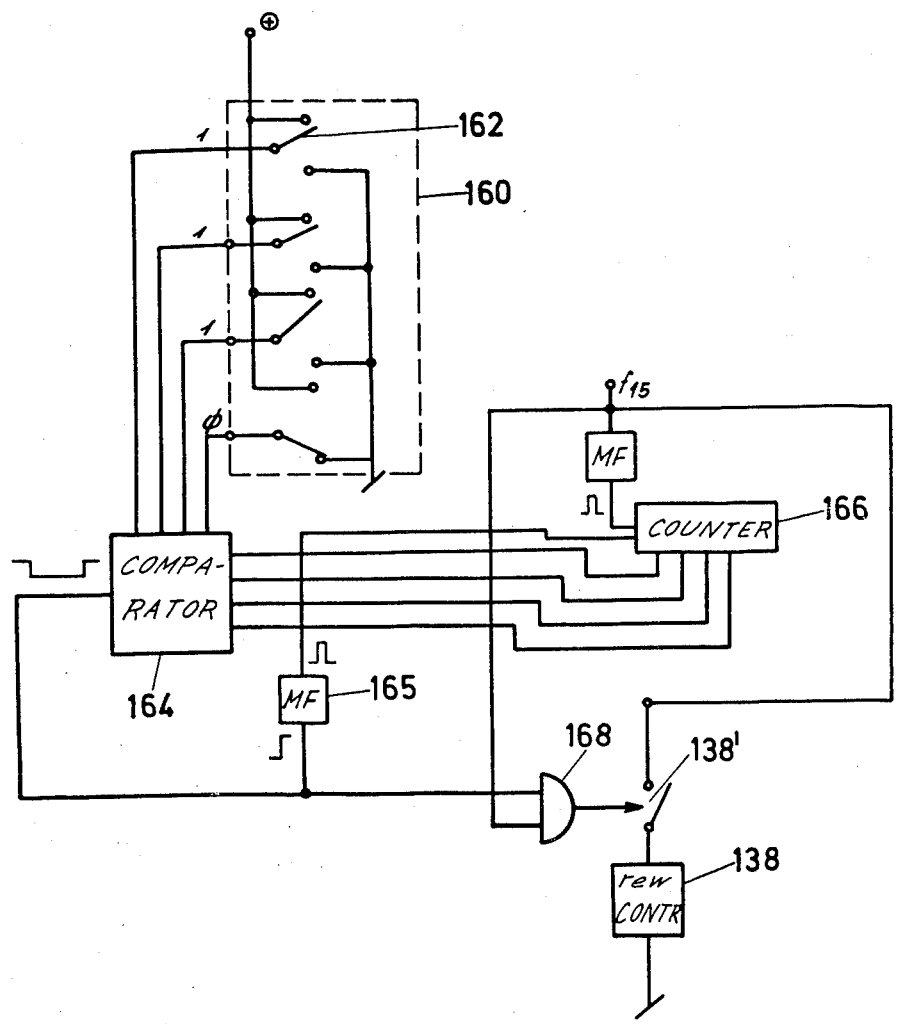
FIG. 11 is an electronic circuitry for the apparatus of FIG. 8 which enables pre-selection of the number of repetitions which are to be performed.

FIG. 11 shows in electronic realization how the apparatus of FIG. 8 may be altered to give the possibility of pre-selecting how many repetition cycles should be performed. Instead of the repeater knob 136 a pre-selection unit 160 is provided which enables by means of switches 162 to pre-select a digital value. In FIG. 11 a value 1-1-1-0 binary is selected which corresponds to decimal 15.

The pre-selected value is led by means of electrical connections to the first input set of comparator unit 164. The contact $f_{15}$ of FIG. 8 is connected to a monostable multivibrator which produces a single impulse each time contact $f_{15}$ is connected to the energy source U0. The output of the monostable multivibrator is led to the clock input of a counter 166 the set of outputs of which is connected to the second set of inputs on comparator unit 164. Counter 166 thus counts how many times contact $f_{15}$ has been connected to the energy source U0 which number corresponds to the number of repetition cycles which have already been performed. As soon as the detected number of repetition cycles matches with the pre-selected digital value the comparator unit 164 will produce a control signal which resets by means of a further monostable multivibrator 165 the counter 166 and which disconnects via an AND gate 168 the rewind control unit 138 from contact $f_{15}$ of FIG. 8. A second input of AND gate 168 is connected directly to contact $f_{15}$ which ensures that disabling of unit 138 will only be performed at the end of a repetition cycle. The lay-out of comparator unit 164 in logic circuitry will not be further described as this unit performs a bit-by-bit comparison, the circuitry for performing this action being known to every man skilled in the art of logic circuitry. The features of FIG. 11 gives the possibility of pre-selecting how many times a selected portion of tape should be repeated.

The simplicity of the apparatus can be enhanced still further by reducing the number of components which are to be actuated by the user.

Figure 12:
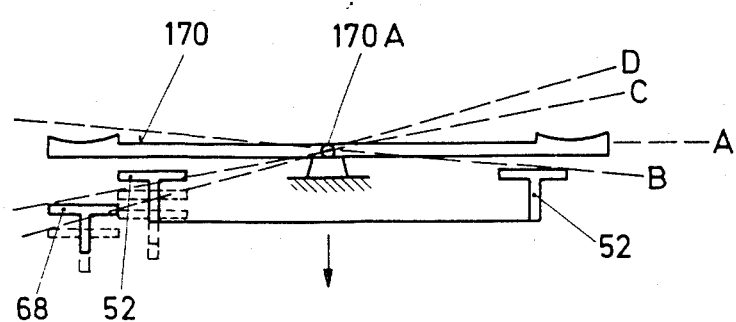
FIG. 12 is a diagrammatic view of a manipulating member which can be utilized to move the starter means and the resetting means of the improved apparatus.

FIG. 12 shows a one-piece manipulating member 170 which is fulcrumed at 170A and can be pivoted into 4 different positions which are indicated by broken lines as at A, B, C and D.

When moved to the position A, the neutral position, the member 170 is idle and depresses none of the knobs 68 and 52. In the position B the knob 52 is depressed and by releasing the member 170, a new end position value will be set. In the position C as well only knob 52 is depressed which is provided as an interconnected pair on both sides of 170A. Moving member 170 into position D depresses also the off-switch 68 in addition to knob 52. Thus, moving member 170 into either position B or C will load a new end position value into the mechanical or electronic storage. If the member 170 is moved into position D, off-switch 68 is actuated. When releasing member 170 out of position D back into position C the off-switch 68 is released, whereby the knob 52 remains depressed. By this action, e.g., in connection with the embodiment of FIG. 8, release of switch 68 results in releasing axis 26, the coupling of which is instantaneously transmitted to spindle 17 and gear 30 because knob 52 remains depressed. Thus, the tape position which was reached when member 170 was moved into position D will automatically be transferred as start position for a new cycle to be set, the end position of which in its turn is set when the member 170 is released to move from position C back into position A. In combination of member 170 of FIG. 12 with the apparatus shown in FIG. 8 only a second knob has to be actuated by the operator, namely the repeater knob 136. This enhanced simplicity for operating the apparatus is particularly desirable in apparatuses which are to be used by temporarily or permanently handicapped persons, e.g., in homes for aged or invalids, in educational institutions for handicapped or analogous establishments. With only one member, start- and end-position of a tape sequence to be repeated can be set, its end position can be altered or a subsequent tape sequence can be set just joining the previously set one.

Figure 13:
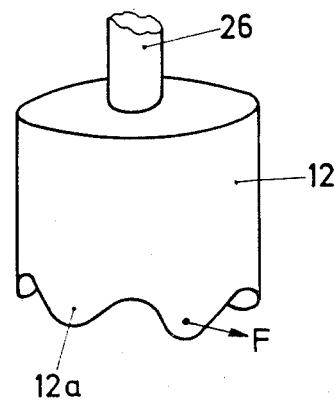
FIG. 13 is an enlarged view of a coupling member to mechanically couple the improved apparatus with a machine.

FIG. 13 shows the coupling crown 12 with its wavelike coupling portions 12a. This specifically laid out coupling portion 12a is important for ensuring that the coupling member will not be mechanically damaged by users and renders it possible that the crown can be coupled to spindle 17 even when latter is rotating. The wave-like coupling parts 12a will not be damaged as would be coupling fingers if the user tries to draw out the cassette before having released the coupling of crown 12 to spindle 17 by activating off-switch 68. A force F which will then act on the coupling portions 12a will not break or even harm the same. Coupling fingers would eventually be bent or even broken.

In the FIGS. 6, 8 and 8A control unit 119, 120, 138, 140, 142, 142' and 803 were described which control on the occurrence of the respective control signals the respective buttons of the tape recorder.

FIG. 14 shows a possible realization which may be used for all the mentioned control units. The control input 172 (according to FIG. 6 connected to comparator unit 117 or 116 or to the off-switch $S_{68}$ or connected according to FIG. 8 to line 146 or contact $d_{15}$ or to contact $d_{16}$ or to switch 136, according to FIG. 11 to AND gate 168) is led on an actuating coil 174 of a relay with a switch $S_D$. The switch $S_D$ is closed when the coil 174 is energized by a control signal at the input 172 so that a much higher current 'I' than will be produced by the units producing the control signal at input 172, will be led via switch $S_D$ to an activating coil of a solenoid 176. The core of the latter will then act on the respective knobs 2, 3, 3A, 5 or 6. The relay with coil 174 and switch $S_D$ converts a low level control signal at the input 172, e.g., a TTL voltage and current signal into an electric signal of much higher level to drive the solenoid 176 and to provide a force on the mentioned buttons high enough to actuate the same.

The apparatus of the present invention differs from previously known apparatus (including that which is disclosed in the aforementioned copending application Ser. No. 780,071, now abandoned) in that a single part (starter knob 52) suffices to select and cause the memories to store values pertaining to both ends of that portion of magnetic tape or another carrier of intelligence which stores intelligence that is to be reproduced at least once upon completion of initial playback, i.e., upon completion of that playback during which the user selects the desired amount of intelligence to be reproduced again in response to movement of the knob 52 back to its first or undepressed position (or in response to such movement of the knob 52 and upon completion of movement of the knob 136 to its operative position). This contributes to simplicity of manipulation of the apparatus. Moreover, the user can select the number of repetition cycles at will. Still further, the user can cause the apparatus to repeatedly play back successive portions of the intelligence on the carrier even though the apparatus can also be operated to play back selected portions of the intelligence on the carrier in any desired sequence. Still further, the user can change the length of that portion of the tape or another carrier which is to be played back while the apparatus is in actual use, i.e., it is not necessary to depress the off knob 68 prior to renewed depression of the knob 52. For more information concerning the field of apparatus described herein reference is made to U.S. Pat. No. 3,913,133 as well as to copending Application Ser. No. 780,071.

Following is a table of electronic components which may be used for the realization of the apparatus according to FIGS. 5, 7, 8, 8A, 9 and 11:

| position number | function | components |
| --- | --- | --- |
| 72, 74, 78, 96; 132, 134, 130, 144 | electrically controlled switches | analog gates from Intersil Inc. |
| 717, 723, 727, 729, 731, 165 etc. | monostable multivibrator | Texas Instruments SN 74 121 |
| 713, 721, 733, 151, 801, 809 | bistable multivibrator | Texas Instruments SN 7476; J-K master-slave flip-flop |
| 166, 711 | counter | Texas Instr. SN 74193 synchronous four bit up/down counters |
| 719, 725 | storages | Texas Instr. SN 74195, four bit parallel access shift register with parallel input |

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the claims.

I claim:

1. An apparatus for controlling the forward and backward movement of an intelligence storing mobile carrier in a machine for recording and reproducing the intelligence, characterized by a single user-actuatable switch operative for controlling, during an initial reproduction, the selection of the carrier of any desired start position and any desired end position of a portion of a selectable length to be repeatedly reproduced, and means for causing the carrier repeatedly to move between the selected start and end positions subsequent to the actuation of said single switch.

2. The apparatus of claim 1 wherein the machine comprises control means for its operation as well as driving means for said carrier for forwards and backwards movement characterized by
  (a) detector means for the carrier position,
  (b) storing means coupled at its inputs to said detector means for the storage of momentary output values of said detector means corresponding to said start- and end-positions, and
  (c) comparator means connected at its inputs with said storing means on one hand and on the other hand with said detector means and being operatively coupled to said control means for said machine,
the switch providing two different signal states in response to its actuation connecting said storing means with said detector means for storing said values.

3. The apparatus of claim 2 characterized in that the comparator means act on actuation means for controlling the control means into playback mode for said machine, if said detector means detect a carrier position which matches one of said values stored in said storage means and act on actuation means for controlling the control means into rewind mode for said machine if said detector means detect a carrier-position which matches the second value stored in said storage means.

4. The apparatus of claim 2, characterized by a second switch the actuation of which stops the control function of said apparatus.

5. The apparatus of claim 2, wherein the causing means connect the detector means with driving means of the machine.

6. The apparatus of claim 2, wherein the detector means comprise a mechanically movable part connectable with said driving means for performing a movement according to a movement of said carrier.

7. The apparatus of claim 6, wherein the storing means comprise mechanical parts for holding mechanical positions within the movement path of said movable part of the detector means.

8. The apparatus of claim 7, the switching means connecting said moving part with said driving means of the machine; the storing means comprising a contact part rigidly connected to a frame of said apparatus, said moving part mechanically contacting said contact part, so that coupling of the moving part defines the position of said contact part within the movement path of said movable part as the start value.

9. The apparatus of claim 6, wherein said moving part acts on a mechanically movable storage means cooperating with locking means said locking means being operatively coupled to said switching means for locking said movable storage means so as to define a limit for the movement of said moving part.

10. The apparatus of claim 6, wherein the comparator means comprise two electrical contact pairs a first contact of each pair being mounted to said moving part ahead and behind of said part with respect to its movement path, a second contact of said pairs being mounted on mechanical parts provided along said path.

11. The apparatus of claim 4, wherein a switching signal of said second switching means only becomes effective if additionally to its occurence the comparator means provide a signal indicative of a stored value matching with a detected position of said carrier.

12. The apparatus of claim 7, comprising a second switching means, actuation of which disables the control function of the apparatus if said moving part has reached one of said mechanical parts.

13. The apparatus of claim 12, wherein the second switching means is connected in series with an electrical contact pair one contact of which is mounted on said movable part the other contact of which is mounted on a part positioned along said path.

14. The apparatus of claim 4 or 12, wherein the second switch is self-holding.

15. The apparatus of claim 2, wherein only the first occurrence of a first signal state produced by the switch connects the detector means with a first storage for a start value, whereas a repeated occurrence of a second signal state produced by the switch repeatedly couples said detector means with a second storage for the end value, whereby first occurence of said first signal state is defined with respect to a preceding actuation of a second switching means.

16. The apparatus of claim 2, wherein the storage means are electronic storages; comprising bistable means connected to one of said storages for disabling or enabling said storage, said bistable means being set by said first signal state to disable said storage.

17. The apparatus of claim 2, said switch being a key.

18. The apparatus of claim 16, said switching means producing a first edge of an electrical signal as first signal state, and a second edge as second signal state, the first edge loading a start value into a first storage means and setting said bistable means for disabling said storage means, the second edge loading on its occurrence an end value into a second storage means.

19. The apparatus of claim 9, a first signal state of said switch releasing said locking means; comprising spring means acting on said movable storage means to propel said storage means onto said movable detector part (35), a second signal state of said switch reactivating said locking means.

20. The apparatus of claim 2, a first signal state of said switching means coupling said detector means to said driving means; comprising a further switch for disabling the apparatus, actuation of said further switch decoupling said detector means from said driving means.

21. The apparatus of claim 6, a first signal state of the switching means coupling said mechanically movable part with said driving means; comprising a further switching means for disabling the apparatus, actuation of said further switching means decoupling said movable part from said driving means.

22. The apparatus of claim 2, said detector means comprising an axially shiftable shaft, a coupling member being mounted to one of its ends for coupling the shaft to said driving means.

23. The apparatus of claim 22, said coupling member being formed as a coupling crown with a wavy coupling portion.

24. The apparatus of claim 23, said coupling portion being wavy in axial direction of said shaft.

25. The apparatus of claim 22, a first signal state of said switch coupling said shaft to said driving means on one hand and coupling said shaft to said detector means on the other hand.

26. The apparatus of claim 2, the detector means comprising a pulse generator unit producing at its output an electrical impulse per incremental movement path of said driving means.

27. The apparatus of claim 26, said detector means comprising counter means for said impulses.

28. The apparatus of claim 2, said storage means comprising two electronic storages.

29. The apparatus of claim 2, a first signal state of said switch coupling said detector means to said driving means as well as to a first storage means for loading a value identifying the start position of the sequence to be repeated into said first storage means; a second signal state of said switching means coupling said detector means to a second storage means for loading a value identifying the end position of said sequence into said second storage means.

30. The apparatus of claim 29, said first signal state disabling said first storage means after having been loaded by said value to prevent subsequent loading, said second storage means being loaded on every occurrence of said second signal state.

31. The apparatus of claim 2, an enabling switch means being connected at the input side of said control means actuation of which enables the control of said control means by said comparator means.

32. The apparatus of claim 31, said enabling switching means being a key.

33. The apparatus of claim 31, said enabling switching means (136) being provided with hold means to hold said switch in actuated position.

34. The apparatus of claim 4, the input of a first storage means for storage of said start value being connectable by said second switch with the output of a second storage means for the storage of said end value, this connection enabling on actuation of said second switch said end value to be stored in said first storage means.

35. The apparatus of claim 2, comprising counter means for registering of the repetition cycles performed, as well as a pre-selection unit for selection of a number of repetition cycles to be performed.

36. The apparatus of claim 4, comprising a single actuation member acting on said switch as well as on said second switch.

37. The apparatus of claim 1, said apparatus being an accessory for a tape recorder.

38. The apparatus of claim 1, whereby the machine comprises control means for its operation, the apparatus comprising electro-mechanical driving means to actuate said control means.

39. The apparatus of claim 1, comprising a second switching means for the control of the machine into at least one repetition cycle on a first track.

40. The apparatus of claim 39, said second switching means being actuatable into two different modes one of which for the control of the machine to perform one repetition cycle, the other of which for the control of the machine to perform continuously repetition cycles.

41. The apparatus of claim 39, comprising a third switch for the control of the machine to perform at least one repetition cycle, said third switch controlling said machine into record mode on a second track.

42. The apparatus of claim 41, comprising a fourth switch for the control of the machine to perform at least one repetition cycle, said fourth switch controlling said machine into playback mode on said second track.

* * * * *